(12) United States Patent
Hernández Carbajal et al.

(10) Patent No.: US 10,982,031 B2
(45) Date of Patent: Apr. 20, 2021

(54) FORMULATION OF TERPOLYMERS BASED ON ALKYL ACRYLATES EMPLOYED AS ANTIFOAMING OF GASIFIED HEAVY AND SUPER-HEAVY CRUDE OILS

(71) Applicant: INSTITUTO MEXICANO DEL PETRÓLEO, Mexico City (MX)

(72) Inventors: Edgar Iván Hernández Carbajal, Mexico City (MX); Alfonso López Ortega, Mexico City (MX); César Andrés Flores Sandoval, Mexico City (MX); Fernando Alvarez Ramírez, Mexico City (MX); Juan de la Cruz Clavel López, Mexico City (MX); Flavio Salvador Vázquez Moreno, Mexico City (MX); Enrique Cevada Maya, Mexico City (MX)

(73) Assignee: INSTITUTO MEXICANO DEL PETROLEO, Mexico City (MX)

( * ) Notice: Subject to any disclaimer, the term of this patent is extended or adjusted under 35 U.S.C. 154(b) by 0 days.

(21) Appl. No.: 15/476,031

(22) Filed: Mar. 31, 2017

(65) Prior Publication Data

US 2017/0283534 A1 Oct. 5, 2017

(30) Foreign Application Priority Data

Mar. 31, 2016 (MX) .................... MX/a/2016/004130

(51) Int. Cl.
*C08F 220/18* (2006.01)
*C08F 220/28* (2006.01)
*C08F 220/14* (2006.01)

(52) U.S. Cl.
CPC .......... *C08F 220/18* (2013.01); *C08F 220/14* (2013.01); *C08F 220/28* (2013.01); *C08F 220/1804* (2020.02); *C08F 220/1806* (2020.02); *C08F 220/1811* (2020.02); *C08F 220/1812* (2020.02); *C08F 220/1818* (2020.02); *C08F 220/281* (2020.02)

(58) Field of Classification Search
CPC .... C08F 220/18; C08F 220/14; C08F 220/28; C08F 220/281; C08F 220/1804; C08F 220/1806; C08F 220/1811; C08F 220/182; C08F 220/1818
See application file for complete search history.

(56) References Cited

U.S. PATENT DOCUMENTS

| | | |
|---|---|---|
| 2,702,793 A | 2/1955 | Smith |
| 2,862,885 A | 12/1958 | Nelson et al. |
| 3,166,508 A | 1/1965 | Fields |
| 3,951,929 A | 4/1976 | Sweeney |
| 4,005,044 A | 1/1977 | Raleigh |
| 4,329,528 A | 5/1982 | Evans |
| 5,169,560 A | 12/1992 | Hart |
| 5,196,486 A * | 3/1993 | Stephenson .......... B01D 17/047 516/189 |
| 5,296,132 A | 3/1994 | Hart |
| 5,389,299 A | 2/1995 | Hart |
| 5,472,637 A | 12/1995 | Hart |
| 5,750,052 A | 5/1998 | Hart et al. |
| 5,766,513 A | 6/1998 | Pillon et al. |
| 5,800,738 A | 9/1998 | Hart |
| 5,955,405 A * | 9/1999 | Liesen .................. C08F 220/18 252/79 |
| 6,001,140 A | 12/1999 | Grabowski et al. |
| 7,001,953 B2 * | 2/2006 | Chen .................... A61K 8/8158 525/123 |

(Continued)

FOREIGN PATENT DOCUMENTS

| | | |
|---|---|---|
| EP | 1029030 | 1/2003 |
| JP | 2014136772 A * | 7/2014 |
| WO | 97/38067 | 10/1997 |

OTHER PUBLICATIONS

"Standard Test Method for Foaming Characteristics of Lubricating Oil", ASTM International IP, Designation D892-13, British Stadard 5092.

(Continued)

*Primary Examiner* — James C Goloboy
(74) *Attorney, Agent, or Firm* — Jason P. Mueller; FisherBroyles, LLP

(57) ABSTRACT

The present invention is related to the application of terpolymers based on alkyl acrylates as defoamers of gasified crude oils, with densities between 10 and 40° API. The evaluation of terpolymers based on alkyl acrylates at conditions similar to those of gas-liquid separators has shown that the terpolymers are efficient as inhibitors of the foam formation in heavy and super-heavy crude oil, abating the foam between 15 and 50% faster than in non-dosed crude oil (blank). Even some acrylic terpolymers exhibited a greater efficiency as defoamers than that of commercial silicon-based polymers, which promoting the defoaming only 20-25% faster than the blank collapse. The employ of silicones as defoamers presents serious problems as the formation of deposits and the deactivation of catalysts in the refining processes. This situation has provoked that refineries in Mexico and a worldwide ban the application of this kind of inorganic polymers, and new silicon-free defoaming agents are required. Therefore, the new silicon free defoamers object of this invention represent an advantageous option to replace the silicon based defoamers employed nowadays by the petroleum industry.

17 Claims, 12 Drawing Sheets

(56) References Cited

U.S. PATENT DOCUMENTS

Figure 1:
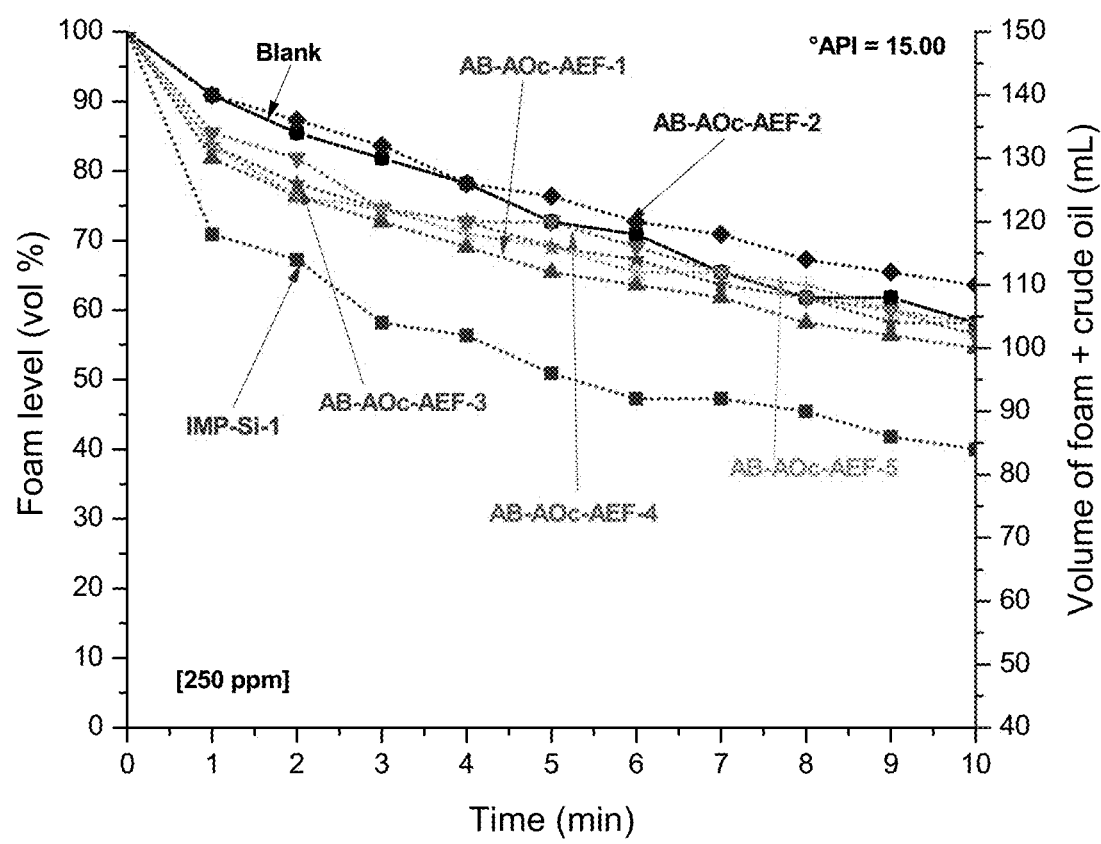

| | | | |
|---|---|---|---|
| 7,308,938 | B1 | 12/2007 | Chatterji et al. |
| 7,517,836 | B2 | 4/2009 | Chatterji et al. |
| 7,863,225 | B2 | 1/2011 | Chatterji et al. |
| 10,213,708 | B2 | 2/2019 | Cevada Maya et al. |
| 10,221,349 | B2 | 3/2019 | Hernandez Carbajal et al. |
| 2007/0254819 | A1 | 11/2007 | Fang et al. |
| 2011/0067295 | A1* | 3/2011 | Castro Sotelo .......... C10L 1/143 44/393 |
| 2012/0004344 | A1* | 1/2012 | Burden .................... C09K 3/00 523/175 |
| 2014/0165457 | A1* | 6/2014 | Castro .................... C10L 10/16 44/393 |
| 2015/0157961 | A1* | 6/2015 | Cevada Maya ........ C10G 29/22 524/379 |

OTHER PUBLICATIONS

"Standard Test Method for High Temperature Foaming Characteristics of Lubricating Oils", ASTM International IP, Designation D6082-12.

Blute et al., "The Molecular Mechanism for Destabilization of Foams by Organic Ions", J. Amer. Oil. Chem. Soc, pp. 41-46, vol. 71, No. 1, Jan. 1994.

Cassani et al., "Evaluation of Foam Inhibitors at the Jusepin Oil/Gas Separation Plant, El Furrial Field, Eastern Venezuela", Society of Petroleum Engineers Latin America Petroleum Engineering Conference, Mar. 8-11, Caracas, Venezuela, pp. 281-287, Society of Petroleum Engineering, 1992.

Ceveda, "Synthesis, characterization and evaluation of antifoaming agents at laboratory level", Instituto Mexicano del Petroleo, Mexico D.F. Agosto, pp. 165-167, 2015.

Cortes, "Evaluation of copolymers in light crude oil Chaac", industrial chemical engineer thesis, ESIQIE-IPN, Mexico D.F. , 2015, p. 125.

Poindexter et al., "Factors Contributing to Petroleum Foaming. 1. Crude Oil Systems", Energy & Fuels, vol. 16, pp. 700-710, 2002.

Zaki et al., "Factors Contributing to Petroleum Foaming. 2. Synthetic Crude Oil Systems", Energy & Guels, vol. 16, pp. 711-717, 2002.

Prud'Homme et al., "FOAMS, Theory, Measurements, and Applications", Marcel Deckker Inc., New York, pp. 180-493, 1996.

Rezende et al., "Evaluation of the efficiency of polyether-based antifoams for crude oil", Journal of Petroleum Science and Engineering, vol. 76, pp. 172-177, 2011.

Ruiz-Morales et al., "Coarse-Grained Molecular Simulations to Investigate Asphaltenes at the Oil-Water Interface", Energy & Fuels, vol. 29, pp. 1597-1609, 2015.

Speight, "Handbook of Petroleum Analysis", Wiley Interscience, U.S.A., pp. 1 and 61, 2001.

Wylde et al., "Successful Field Application of Novel, Nonsilicone Antifoam Chemistries for High-Foaming Heavy-Oil Storage Tanks in Northern Alberta", SPE/PS-CIM/CHOA, International Thermal Operations and Heavy Oil Symposium, Calgary, Alberta, Canada, 2008.

Fallin et al., "Defoaming Agents for Increased Oil Production Rates of Foamy Crudes—Laboratory Screening Tests and Field Results", SPE 2841, J. Petrol. Technol., vol. 23, pp. 233-238, 1971.

* cited by examiner

FORMULATION OF TERPOLYMERS BASED ON ALKYL ACRYLATES EMPLOYED AS ANTIFOAMING OF GASIFIED HEAVY AND SUPER-HEAVY CRUDE OILS

TECHNICAL FIELD OF THE INVENTION

The present invention belongs to the field of chemical products to control the foam which is formed in gasified crude oil, in particular to free silicon antifoaming compounds. This invention corresponds to the application of terpolymers based on alkyl acrylates, silicon-free, to inhibit or suppress foaming in gas-liquid separation equipments for crude oils with densities from 10 to 40° API.

BACKGROUND OF THE INVENTION

Crude oil is extracted along with natural gas, which provokes the formation of foam of great physicochemical complexity. These foams cause operational problems along of extraction and transport process of crude oil such as: low productivity of wells, transport pumps cavitation (Fallin et al., 1971), deposit formation, liquid drag into gas streams, gas and water drag into streams of crude oil and reduction in separators capacity (Wylde et al., 2008). The formation of foam in the crude oil streams could cause a flooding of separation equipment and containers, as well as reduction of the operational capacity. Studies carried out by Poindexter et al. have shown that oil foams become more stable by increasing the following parameters:

1) Density of crude oil.
2) Viscosity of crude oil.
3) Resins and asphaltenes amount in crude oil (Poindexter et al., 1, 2002).
4) Asphaltene dispersion grade in crude oil (Poindexter et al., 2, 2002).

Obviously, all these physicochemical parameters are increased by decreasing the API gravity and becoming more heavy the crude oil. This explains because the problems of foaming are particularly critical in case of heavy and super-heavy crude oils.

The serious drawbacks associated to the formation of foams in the crude oil have been controlled by the use of chemical compounds of surfactant type, with an amphiphilic molecular structure, knowing as antifoaming agents. To be dissolved in crude oil, the antifoaming agents inhibit the formation of foams or, if these are already present in the system, cause them collapse. It has been observed that a good antifoaming agent should be very little soluble in crude oil, not cause sudden gradients in the gas/crude oil interfacial tension, must be resistant to temperature changes and the degradation caused by other chemical agents, as well as the attacks of oxidation reactions (Prud'homme R. et al., 1996).

Inhibition of the formation of foams in crude oils is a multifactorial problems of great complexity. The literature on the subject reports that an antifoaming agents needs to penetrate the gas/oil interface and disperse over the surface of crude oil (Blute et al, 1994). Also it has pointed out that the presence of heteroatoms, as the oxygen atom, favors the accommodation of surfactants agents at the interface of crude oil system (Ruiz-Morales and Mullins, 2015). The presence of heteroatoms could be seen in the products commercially employed as antifoams for crude oils, such as silicones and fluorosilicones, phosphate esters, fatty acid metallic surfactants, amides, polyglycols, glycol esters, polyethers, fatty acid esters and alcohols (Prud'homme et al., 1996). Among these stand out the siloxanes due to their high antifoaming capacity, which are dossed in concentrations around 10 ppm or even less. However, it has been shown that the massive use of silicon-based defoamers causes very serious problems, such as the poisoning of catalyst in the hydrodesulphurisation process, as well as the formation of deposits in ducts and installations.

The technical literature shows that silicone (dimethyl polysiloxane) has been used since 1940s to inhibit the formation of foam. In U.S. Pat. No. 2,702,793 is reported the application of a mixture of dimethylsilicone and amyltriethoxysilane to inhibit the foam formation in stream crude oils. Similarly, in U.S. Pat. No. 2,862,885 is described the use of a monovinilalkoxysilane as defoamer in crude oil. In the other hand, in U.S. Pat. No. 4,005,044 is disclosed the use of a dimethylpolysiloxane liquid as antifoaming agent in a solution of emulsifying agent.

With the purpose of improving the performance of polysiloxanes as defoamers, chemical modifications have been carried out to these polymers. A chemical modification is to obtain copolymers such as linear copolymer of fluoro-alkyl polysiloxane, as is marked in the U.S. Pat. No. 4,329,528, with a composition from 20 to 70 mol % of fluorosilicone, displaying a great performance at high temperatures (in the range from 25 to 370° C.) and good solubility in crude oil. This copolymer is employed in the crude oil reserves as a method to inhibit or suppress the foaming formation, adding at least 1 ppm of this defoamer agent (Evans, 1982).

International Patent WO 97/38067 and U.S. Pat. No. 6,001,140A is described the usage of copolymers, which have a base structure constituted by polysiloxane and over which is drafted an organic group, mainly a polymer with $MD_xD'_yD''_zM$ formula, where M is $O_{0.5}Si(CH_3)_3$, D is a $OSi(CH_3)_2$, D' is $OSi(CH_3)R$ and D" is $OSi(CH_3)R'$. Simultaneously, R is a polyhydric organic group $C_6$-$C_{28}$, whereas R' is a phenol derivative or an aliphatic long-chain group.

Cassani F. et al. has reported studies at laboratory and field level about the evaluation of six commercial silicon-based antifoaming agents in crude oils of medium density (21 a 27° API), likewise the optimal dosages to curb the foam generated in separation equipment. Optimal dosages in a range between 0.01 and 1 ppm were found at laboratory level for these silicon-based antifoaming agents (formulation containing between 2 and 4% of silicon in kerosene as solvent) in medium crude oil of 26.3° API. These dosages were also verified a field level.

Due to operational drawbacks relating to silicon-based products, for some time new alternatives without silicon compounds have been sought, to evaluate them as defoamer agents in crude oil. Such defoamer agents called "silicon-free" are organic compounds consisting essentially of sulphates and phosphates (Hart, 1992), vegetal (Hart, 1994) and animal oils (Hart, 1995), polyisobutylene compounds (Hart, 1995 and Hart, 1998), polypropylene oxide/polyethylene oxide block copolymers (Hart, 1998) and mixtures of the previous ones.

Vegetal oils such as jojoba oil (*Simmoridsia chinensis*) and animal oils such as mink oil (Neovison vison) have been employed to control foam at high temperatures (150 to 500° C.) in hydrocarbon fluids during distillation and/or delayed coking processes of crude oil, as it is pointed out in U.S. Pat. Nos. 5,296,132A and 5,389,299A, respectively. Effective dosages as antifoaming agents in the patents cited were in the range between 10 and 1000 ppm (Hart, 1994 and 1995) and because of the low viscosity of these products, they may be added in pure form or in solution. It must be stressed the high cost of using these compounds as agents for the conditioning of petroleum.

U.S. Pat. Nos. 5,472,637A and 5,800,738A describe the usage of high molar mass polyisobutylene (between 2000 and 2 000 000 Daltons) and low molar mass (320 Daltons) as defoamers in crude oil and/or derivatives of it.

Alkoxylated alkylphenolformaldehyde compounds with block copolymers of propylene oxide/ethylene oxide have also been made, with molar mass between 2000 and 6000 Daltons, to control the foam in hydrocarbon hydrocracking separation systems, in doses ranging from 15 to 1500 ppm, as stated in the U.S. Pat. No. 5,750,052A.

Some methods in drilling or well treatments have been developed to halt the formation or the breaking down of foam, where the treated fluid is a liquid which is added a defoamer agent. According to the antifoaming agent composition this may be useful in well conditioning (drilling fluids, foundation fluids, etc.). This addition prevents foaming and air drag during stirring, mixing or pumping of those fluids. The composition of these antifoaming agents comprises a carboxylic acid amide, a propylene glycol, and a fatty alcohol ($C_{12-15}$) ethoxylated and propoxylated (Chatterji, 2007, 2009, 2011).

Rezende D. A., et al. have gauged the performances of commercial block copolymer poly (ethylene oxide)-poly (propylene oxide) and polysiloxanes grafted polyethers defoamer agents, in two crude oil samples with similar SARA compositions (saturated, aromatics, resins and asphaltenes analysis), as well as its density and viscosity (Danielle, 2011). Polysiloxanes grafted with polyethers groups showed the best performance as foam inhibitors in the crude oils.

Wylde J. has studied the formation of foam in crude oil from northern Alberta, Canada, with densities from 10 to 12° API. However, using the assessment method for foam formation described in his study (modification from standard ASTM D892-13 method) and due to the high viscosity of super-heavy crude oil selected to be evaluated (12° API), it was not feasible to create relevant foam levels to perform the evaluations of the antifoaming agents in study. To resolve this difficulty, a considerable amount of n-heptane was added to super-heavy crude oil, in order to create an artificial light crude oil with lower viscosity and to thus measure the foam inhibitory efficiency of the antifoaming agents. Certainly, the addition of n-heptane provokes asphaltenes loss in the crude oil. The defoamer agents studied were all silicon-free chemicals: compounds based on sulfates and phosphates, ethoxylated esters, polyethylene-glycol esters, ethoxylated alcohols (11 commercial chemicals obtained from market). In these field estimate mixtures of sulfonated salts and ethoxylated fatty alcohol adducts with ethylene oxide and propylene oxide showed to be effective as defoamers. One serious limitation of this study is that the mentioned chemicals are only effective as defoamers in deasphalted crude oil and not in real heavy crude oils.

Performance of various polyethers as antifoaming agents in heavy crude oil has recently described (Cortés, 2015), such as homopolymers and copolymers of ethylene oxide and propylene oxide. However, the foam suppressing capacity of these products is revealed to be low when are applied in gasified heavy crude oils.

In the case of polyacrylates or acrylic compounds, there are several references reporting their application to condition petroleum and its derivatives. However, their usage as defoamer agents has been focused on various types of oils derived from petroleum and not specifically on the control of foams of crude oil. The assessment of antifoaming acrylics in lubricating oils for internal combustion engines, lubricating oil pumps, hydraulic oils, etc. has been reported. The lubricants mentioned may be natural or synthetic (U.S. Pat. No. 3,166,508). Antifoaming acrylics are added to lubricating oils in dosages ranging from 10 to 50 ppm, although they show an adequate performance in some types of oils. It should be noted that U.S. Pat. No. 3,166,508 does not mention the usage of polyacrylates as antifoam agents of any crude oil conditioning process. Indeed, because the presence of high concentrations of resins and asphaltenes in crude oil, which does not occur in any lubricating oil, it is not possible to infer an antifoaming potential of acrylics applied in heavy or super-heavy crude oils. Furthermore, U.S. Pat. No. 3,166,508 does not report the enormous influence of the molecular mass adjustment of polyacrylates on their performance as antifoaming agents in specific samples of crude oil. Similarly, in U.S. Pat. No. 5,766,513A is disclosed the usage of combination of fluorosilicone-based antifoaming agent with one defoamer based on polyacrylate, which is effective to diminish the foam in lubricant oils at low and high temperatures. However, by themselves, neither fluorosilicone nor acrylic are efficient in reducing foam of lubricating oils at same assessment conditions. On the other hand, it has been reported that copolymers and terpolymers based on acrylic (mainly of monomers as alkyl methacrylates, where the alkyl radical contains a fluoroaliphatic group of 3 to 20 carbon atoms) have shown to inhibit the foaming in hydrocarbon lubricant oils, but not in crude oils. These copolymers and terpolymers based on acrylates are divulged in U.S. Pat. No. 7,700,527B2 and EP 102903061, respectively.

Among other applications of the polyacrylates as agents for crude oil conditioning, different of the foam formation inhibition, it could be mentioned their use as pour point depressor in paraffinic crude oils (in U.S. Pat. No. 3,951, 929). Polyacrylates also have shown high performance as viscosity reducers in heavy crude oils, such as described in U.S. Patent 20110067295A1 (Castro, 2011). This viscosity-reducing capacity may partly explain the decrease in the stability of the thin lamellae separating the bubbles that make up the oil foam.

In 2013, searching an alternative to the use of silicon antifoaming agents for crude oils, a group of IMP researchers developed a series of acrylic homopolymers, which proved to be more efficient than the silicones as inhibitors and suppressing the formation of foam in heavy and super-heavy crude oils (MX/a/2013/014352). Acrylic structure, equipped with numerous oxygen atoms, is in accordance with the criteria designated by Ruiz Morales and Mullins, which refers to their ability to displace the asphaltenes in petroleum interfaces (Ruiz-Morales and Mullins, 2015). The use of polyacrylates not only allows to control the foams of crude oils, but also allows avoiding the formation of silicon compound deposits in ducts and installations, as well as preventing the deactivation of catalysts by silicones in processes of refining. These acrylic homopolymers could be combined together to obtain formulations with better antifoam properties than those of individual polyacrylate. It is also important to highlight the low cost of acrylics over silicon and other silicon-free defoamer products.

Later on, in 2013 was disclosed the development of new antifoams agents totally silicon-free based on acrylic copolymers (patent MX/E/2015/009234). Polyacrylates were synthesized by combining pairs of different acrylic monomers within a same polymeric chain. Acrylic copolymers synthesized by semicontinous emulsion polymerization were assessed in gasified heavy and super-heavy crude oils, exhibiting not only a higher antifoaming activity than the silicones and the commercial silicon-free antifoaming agents, but even the acrylic homopolymers of the patent application MX/a/2013/014352 (Cevada, 2015).

A new alternative for the control of foams in crude oils is the use of terpolymers based on acrylic, which is the subject of the present invention. These compounds consist of macromolecular chains composed of random sequences of three different acrylic structural units. Because the monomers have different reactivity, their addition to a chain in a homogenous way is not always ensured, polymers with long sequences of the same monomer could be obtained, which results in possible efficiency losses as antifoams. It is also possible that two of the monomers have a poor tendency to react with each other. To avoid these problems, it has been used synthesis procedures in semi-continuous reactor (Castro, 2011). The device used for the preparation of these new antifoaming agents consists of a main reactor, which is fed from an addition tank to a speed lower than the polymerization speed in the reactor. This way of addition prevents that the monomers are accumulated over the synthesis time, forcing them to incorporate instantaneously into the polymer chains. The continuity of the feed during the reaction allows ensuring that all polymeric chains maintain a constant composition of the three added acrylic monomers. New terpolymers based on alkylacrylates that are presented in this invention, have shown to be efficient as foam inhibitors in heavy and super-heavy crude oils with densities between 10 and 40° API, constituting an innovation based on the synthesis process protected by the patent application MX/a/2013/014352. It is important to remember that this polymerization process, based on semi-continuous emulsion polymerization techniques, hast the great advantage of using water as a dispersion medium instead of organic solvents, which are expensive and harmful to the environment. Additionally, antifoaming capacity of acrylic terpolymers has been evaluated in gasified crude oil (oil containing the natural gases that have dissolved in the oil during millions of years in the deposit), under conditions close to the real operational conditions of the gas/liquid separators employed in the oil industry. Thus, it has been rigorously demonstrated that acrylic terpolymers possess a marked efficiency as suppressors and inhibitor of foam, superior even in many cases to the polysiloxanes used to condition petroleum streams. Terpolymers based on acrylates additionally have the advantage of not generate inorganic deposits or deactivating the catalysts in the refining process.

Antifoaming agents based on acrylic terpolymers constitute a new option for inhibiting and suppressing foam in heavy and super-heavy crude oils, which are a suitable replacement for antifoaming agents based on silicone, and providing a solution to the problems facing by the industries of production, transport and refining of petroleum.

REFERENCES

ASTM D-892-13, "*Standard test method for foaming characteristics of lubricating oils*".
ASTM D-6082-12, "Standard test method for high temperature foaming characteristics of lubricating oils".
Blute I., Jannson M., Oh S. G. and Shah D. D., "*The molecular mechanism for destabilization of foam by organic ions*", J. Amer. Oil. Chem. Soc., 71, 41-46, (1994).
Cassani F. and Ortega P., Davila A. and Rodriguez W., and Serrano J., "*Evaluation of Foam Inhibitors at the Jusepin Oil/Gas Separation Plant, El Furrial Field, Eastern Venezuela*", SPE Latin America Petroleum Engineering Conference, 8-11 March, Caracas, Venezuela, Society of Petroleum Engineering, (1992).
Castro L. V., Flores E. A., Cendejas G., Lozada M. and Vazquez F. S., "Formulations of random polymers for improving crude petroleum flow", U.S. Patent Application 20110067295A1, 24 Mar. 2011.
Cevada E., Castro L. V., Hernández E., Flores C. A., López A., Estrada A., Alvarez F. and Vazquez F. S., "Formulaciones de homopolimeros base acrilatos de alquilo empleadas como antiespumantes en aceites crudos pesados y súper pesados", Solicitud de patente mexicana MX/a/2013/014352, 6 Dec. 2013.
Cevada E., Castro L. V., Hernández E. I., Flores C. A., Lopez A., Estrada A., Alvarez F., Estrada A., Vazquez F. S., "Formulations of homopolymers based on alkyl acrylates used as antifoaming agents in heavy and super-heavy crude oils", U.S. Patent Application 20150157961, Jun. 11, 2015.
Cevada E., "*Síntesis de nuevos compuestos antiespumantes libres de silicio y diseño de formulaciones antiespumantes con base en poliéteres, acrílicos y ésteres de ácidos grasos con aplicación en aceites crudos pesados*", Tesis de doctorado en ingenieria, Instituto Mexicano del Petróleo, México D.F. Agosto (2015), pp-165-167.
Chatterji J. and King B. J., "Defoaming methods and compositions", U.S. Pat. No. 7,308,938B1, Dec. 18, 2007.
Chatterji J. and King B. J., "Defoaming methods and compositions", U.S. Pat. No. 7,517,836B2, Apr. 14, 2009.
Chatterji J. and King B. J., "Defoaming methods and compositions", U.S. Pat. No. 7,863,225B2, Jan. 4, 2011.
Cortés A., "*Evaluación fisicoquímica de nuevos poliéteres como agentes antiespumantes en aceites crudos pesados*", Tesis ingeniero químico industrial, ESIQIE-IPN, México D.F. (2015), p. 125.
Estrada A., Cevada E., Castro L. V., Flores C., López A., Álvarez F., Estrada A. and Vázquez F., "Aparato para medir espuma", Solicitud de patente mexicana MX/a/2013/013966, 28 Nov. 2013.
Evans E. R., "Method of defoaming crude hydrocarbon stocks with fluorosilicone compounds", U.S. Pat. No. 4,329,528, May 11, 1982.
Fallin S., Sharp S. P. and Wolfe J. L., "*Defoaming agents for increased oil production rates of foamy crudes*", SPE 2841, J. Petrol. Technol., 23, 233-238, (1971).
Fang J. Z. and Zhao M., "Foaming-resistant hydrocarbon oil compositions", U.S. Pat. No. 7,700,527B2, Apr. 20, 2010.
Fields J. E., "Hydrocarbon oils of reduced foaming properties", U.S. Pat. No. 3,166,508, Jan. 19, 1965.
Grabowski et al., "Diesel fuel and lubricating oil antifoaming and methods of use", U.S. Pat. No. 6,001,140A, Dec. 14, 1999.
Grolitzer M. and Zhao M., "Foaming-resistant hydrocarbon oil compositions", E.P. Patent 102903061, Aug. 23, 2000.
Hart P. R., "Control of foam in hydrocarbon fluids", U.S. Pat. No. 5,169,560A, Dec. 8, 1992.
Hart P. R., "High temperature hydrocarbon defoamer composition and method", U.S. Pat. No. 5,296,132A, Mar. 22, 1994.
Hart P. R., "High temperature hydrocarbon defoamer composition and method", U.S. Pat. No. 5,389,299A, Feb. 14, 1995.
Hart P. R., "Control of foam in hydrocarbon fluids", U.S. Pat. No. 5,472,637A, Dec. 5, 1995.
Hart P. R. and Dion M. A., "Foam control method", U.S. Pat. No. 5,750,052A, May 12, 1998.

Hart P. R., "Methods for inhibiting foam in crude oils", U.S. Pat. No. 5,800,738A, Sep. 1, 1998.

Hernández E. I., Cevada E., López A., Flores C. A., Álvarez F., Estrada A. y Vázquez F. "Formulaciones de copolímeros base acrilatos de alquilo empleados como antiespumantes en aceites crudos pesados u súper-pesados", Solicitud de patente mexicana MX/E/2015/009234, 17 Jul. 2015.

Nelson R. S., Larchmont and Charles W., "Foam inhibition in hydrocarbon oils", U.S. Pat. No. 2,862,885, Dec. 2, 1958.

Pillon L. Z. and Asselin E., "Antifoaming agents for lubricating oils", U.S. Pat. No. 5,766,513A, Jun. 16, 1998.

Poindexter M. K., Zaki N. N., Kilpatrick P. K., Marsh S. C. and Emmons D. H., "*Factors contributing to petroleum foaming. 1. Crude oil systems*", Energy and Fuels, 16, 700-710, (2002).

Poindexter M. K., Zaki N. N., Kilpatrick P. K., Marsh S. C. and Emmons D. H., "*Factors contributing to petroleum foaming 2. Synthetic crude oil systems*", Energy and Fuels, 16, 711-717, (2002).

Prud'homme R. K. and Khan S. A., "*Foams, theory, measurement and applications*", Marcel Deckker Inc, New York, pp 480-493, (1996).

Raleigh W. J., "Method of making aqueous antifoam compositions", U.S. Pat. No. 4,005,044, Jan. 25, 1977.

Rezende, D. A., Bittencour, Rafael R., Mansur, Claudia R. E., "*Evaluation of the efficiency of polyether-based antifoams for crude oil*", Journal of Petroleum Science and Engineering, (2011).

Ruiz-Morales Y. and Mullins O. C., "*Coarse-grained molecular simulation to investigate asphaltenes at the oil-water-interface*", Energy & Fuels, 2015, 29, 1597-1609.

Smith W. R., "Foam-inhibiting and foam-inhibited compositions", U.S. Pat. No. 2,702,793, Feb. 22, 1955.

Speight J. G., "*Handbook of petroleum analysis*", Wiley Interscience, U.S.A., pp 1, 61, (2001).

Sweeney M. W, "Polyacrylates and waxy residual fuel compositions thereof", U.S. Pat. No. 3,951,929, Apr. 20, 1976.

Wylde J. J., "*Successful field application of novel non-silicone antifoam chemistries for high heavy oil storage tanks in Northern Alberta*", SPE/PS-CIM/CHOA Int. Thermal Operations and heavy Oil Sym., Calgary, Alberta, Canada, (2008).

BRIEF DESCRIPTION OF THE DRAWINGS OF THE INVENTION

In first instance, FIGS. 1 to 5 show the results of the assessments conducted to determine the performance of these terpolymers based on alkyl acrylates as new antifoaming agents of gasified heavy crude oil with 15° API. Likewise, in FIGS. 6 to 10 are presented the results of the terpolymers based on alkyl acrylates evaluated in gasified super-heavy crude oil with 13° API.

FIG. 1 shows the performance of AB-AOc-AEF-1 terpolymer with a chemical composition of Butyl acrylate ("AB") monomer 33 wt %, Octyl acrylate ("AOc") monomer 33 wt %, and ethylphenyl acrylate ("AEF") monomer 33 wt %; AB-AOc-AEF-2 terpolymer with a chemical composition of AB monomer 50 wt %, AOc monomer 25 wt %, and AEF monomer 25 wt %; AB-AOc-AEF-3 terpolymer with a chemical composition of AB monomer 25 wt %, AOc monomer 50 wt %, and AEF monomer 25 wt %; AB-AOc-AEF-4 terpolymer with a chemical composition of AB monomer 25 wt %, AOc monomer 25 wt %, and AEF monomer 50 wt %; AB-AOc-AEF-5 terpolymer with a chemical composition of AB monomer 50 wt %, AOc monomer 25 wt %, and AEF monomer 25 wt %, but with different molecular mass than AB-AOc-AEF-1 terpolymer; the terpolymers are evaluated as antifoaming agents of gasified crude oil of 15° API (heavy) at concentrations of 250 ppm and compared to the commercial silicon-based product IMP-SI-1.

Figure 2:
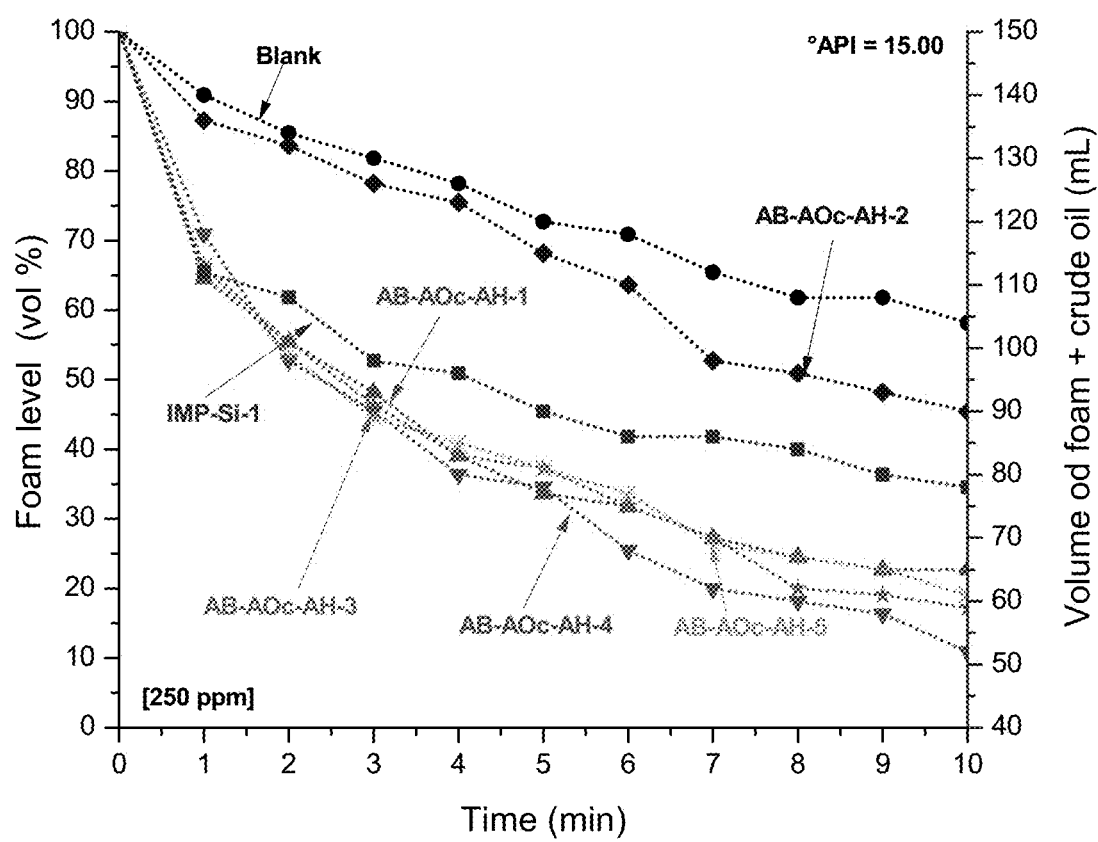

FIG. 2 shows the performance of AB-AOc-AH-1 terpolymer with a chemical composition of AB monomer 33 wt %, AOc monomer 33 wt %, and 2-ethylhexyl acrylate ("AH") monomer 33 wt %; AB-AOc-AH-2 terpolymer with a chemical composition of AB monomer 50 wt %, AOC monomer 25 wt %, and AH monomer 25 wt %; AB-AOc-AH-3 terpolymer with a chemical composition of AB monomer 25 wt %, AOc monomer 50 wt %, and AH monomer with 25 wt %; AB-AOc-AH-4 terpolymer with a chemical composition of AB monomer 25 wt %, AOc monomer 25 wt %, and AH monomer 50 wt %; AB-AOc-AH-5 terpolymer with a chemical composition of AB monomer 50%, AOc monomer 25 wt %, and AH monomer 25 wt %, but with different molecular mass than AB-AOc-AH-1 terpolymer; the terpolymers are evaluated as antifoaming agents in gasified heavy crude oil of 15° API, at concentrations of 250 ppm and compared to the commercial silicon-based product IMP-SI-1.

Figure 3:
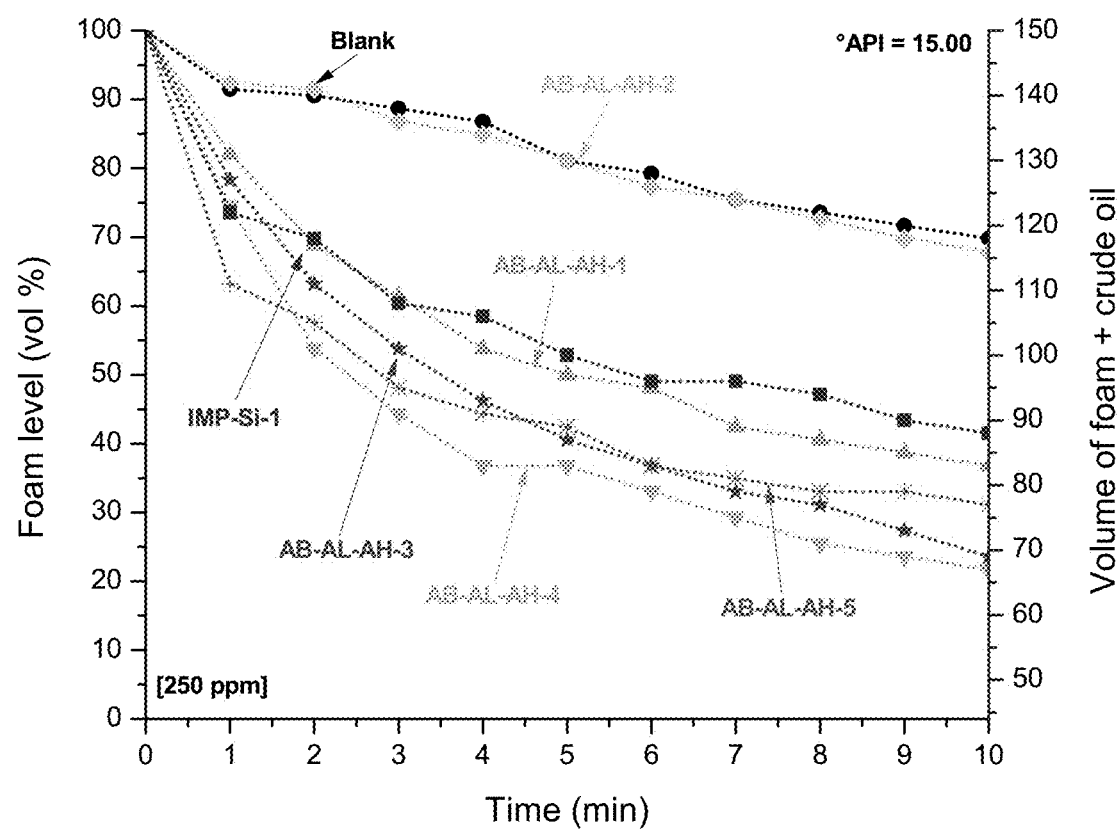

FIG. 3 shows the performance of AB-AL-AH-1 terpolymer with a chemical composition of AB monomer 33 wt %, lauryl acrylate ("AL") monomer 33 wt %, and AH monomer 33%; AB-AL-AH-2 terpolymer with a chemical composition of AB monomer 50 wt %, AL monomer 25 wt %, and AH monomer 25 wt %; AB-AL-AH-3 terpolymer with a chemical composition of AB monomer 25 w %, AL monomer 50 wt %, and AH monomer 25 wt %; AB-AL-AH-4 terpolymer with a chemical composition of AB monomer 25 wt %, AL monomer 25 wt %, and AH monomer 50 wt %; AB-AL-AH-5 with a chemical composition of AB monomer 50 wt %, AL monomer 25 wt %, and AH monomer 25 wt %, but with different molecular mass than AB-AL-AH-1 terpolymer; the terpolymers are evaluated as antifoaming agents in gasified heavy crude oil of 15° API at concentrations of 250 ppm and are compared to the commercial silicon-based product IMP-SI-1.

Figure 4:
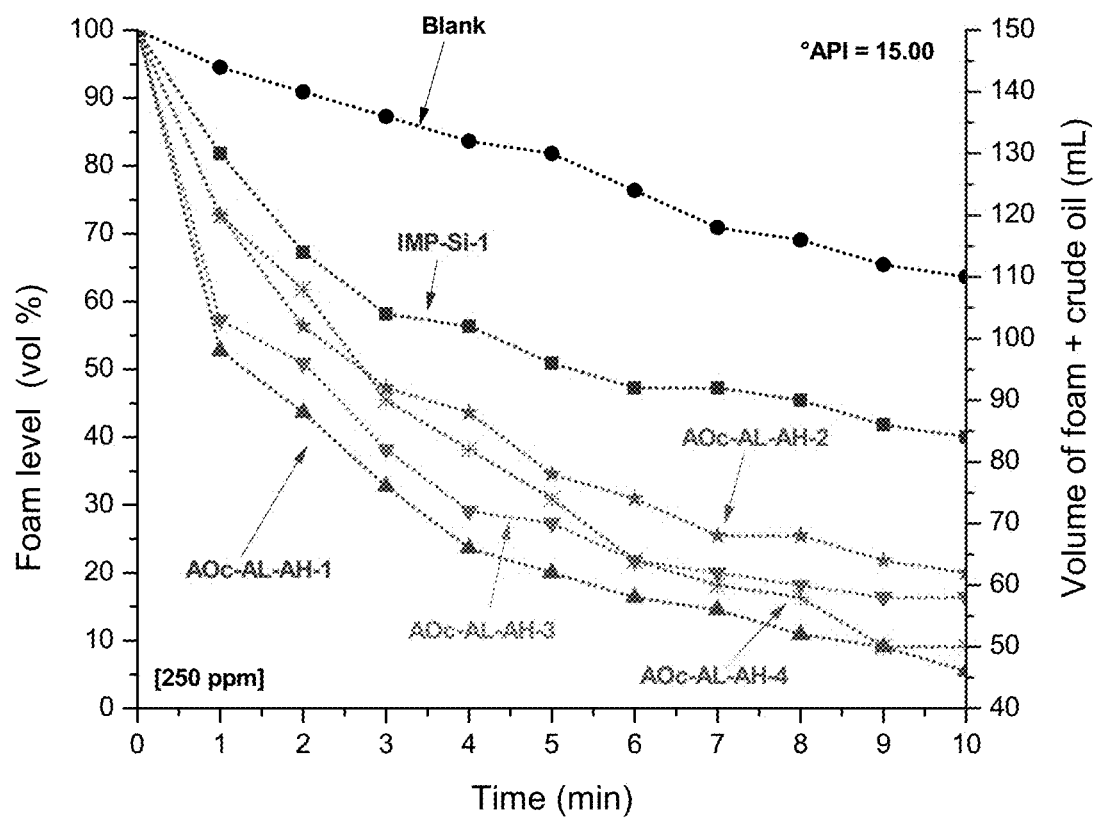

FIG. 4 depicts the performance of AOc-AL-AH-1 terpolymer with a chemical composition of AOc monomer 33 wt %, AL monomer 33%, and AH monomer 33%; AOc-AL-AH-2 terpolymer with a chemical composition of AOc monomer 25 wt %, AL monomer 50%, and AH monomer 25 wt %; AOc-AL-AH-3 terpolymer with a chemical composition of AOc monomer 25 wt %, AL monomer 25 wt %, and AH monomer 50 wt %; AOc-AL-AH-4 terpolymer with a chemical composition of AOc monomer 50 wt %, AL monomer 25 wt %, and AH monomer 25 wt %; the terpolymers are evaluated as antifoaming agents in gasified heavy crude oil of 15° API a concentrations of 250 ppm and compared to the commercial silicon-based product IMP-SI-1.

Figure 5:
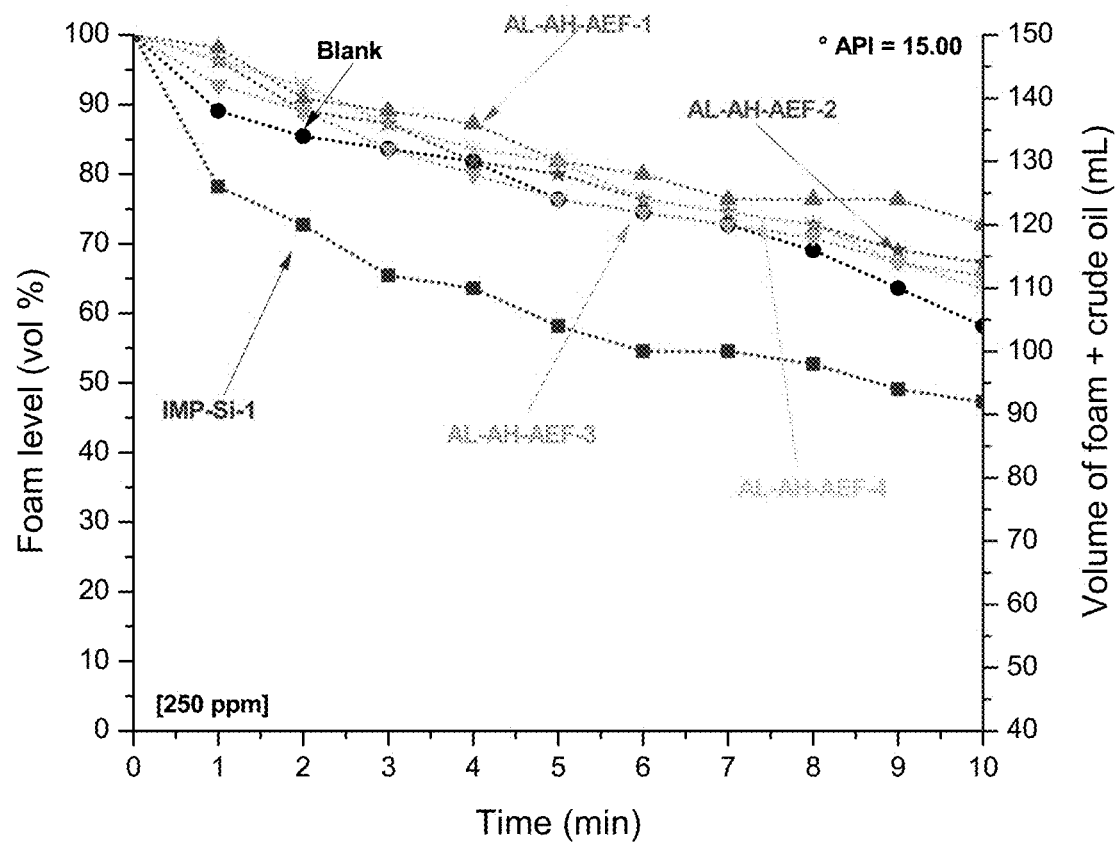

In FIG. 5 is reported the performance of AL-AH-AEF-1 terpolymer with a chemical composition of AL monomer 33 wt %, AH monomer 33 wt % and AEF monomer 33 wt %; AL-AH-AEF-2 terpolymer with a chemical composition of AL monomer 25 wt %, AH monomer 50 wt %, and AEF monomer 25 wt %; AL-AH-AEF-3 terpolymer with a chemical composition of AL monomer 25 wt %, AH monomer 25 wt %, and AEF monomer 50 wt %; AL-AH-AEF-4 terpolymer with a chemical composition of AL monomer 50 wt %, AH monomer 25 wt %, and AEF monomer 25 wt %; the terpolymers are evaluated as antifoaming agents in gasified heavy crude oil of 15.00° API a concentrations of 250 ppm and are compared with the commercial silicon-based product IMP-SI-1.

Figure 6:
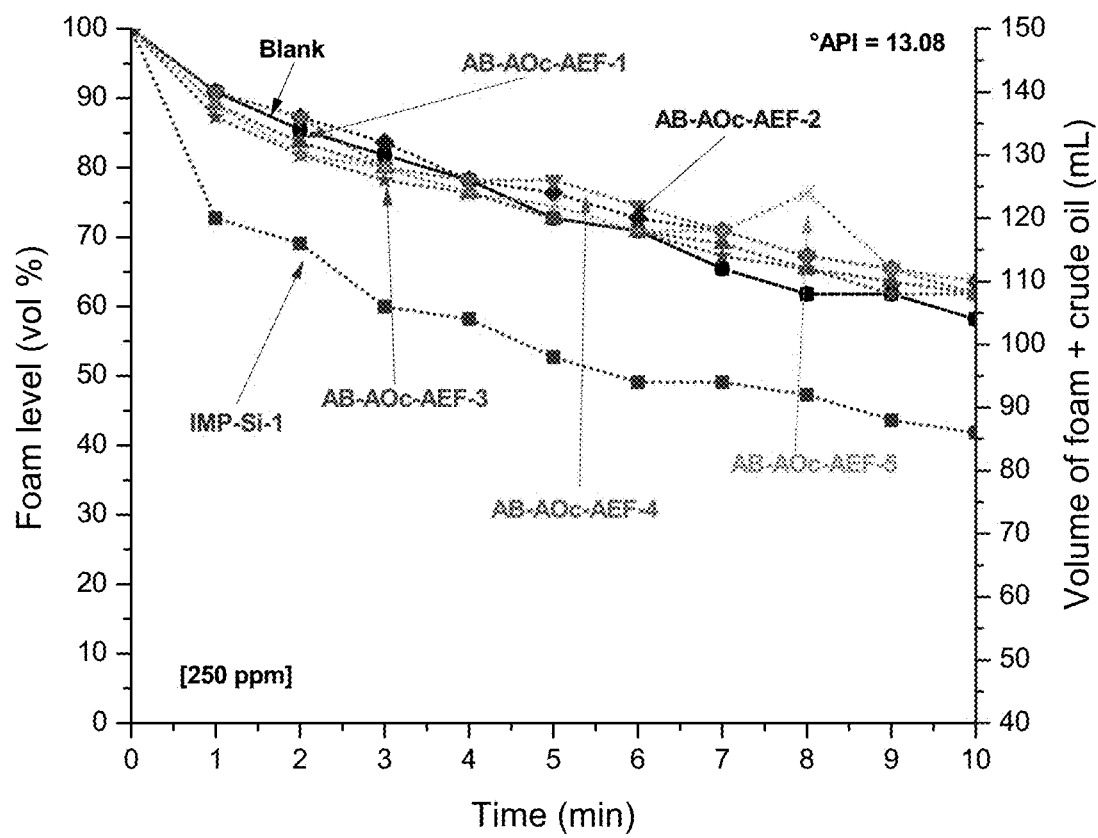

FIG. 6 shows the performance of AB-AOc-AEF-1 terpolymer with a chemical composition of AB monomer 33 wt %, AOc monomer 33 wt %, and AEF monomer 33 wt %; AB-AOc-AEF-2 monomer with a chemical composition of AB monomer 50 wt %, AOc monomer 25 wt %, and AEF monomer 25 wt %; AB-AOc-AEF-3 terpolymer with a chemical composition of AB monomer 25 wt %, AOc monomer 50 wt %, and AEF monomer 25 wt %; AB-AOc-AEF-4 terpolymer with a chemical composition of AB monomer 25 wt %, AOc monomer 25 wt %, and AEF monomer 50 wt %; AB-AOc-AEF-5 terpolymer with a chemical composition of AB monomer 50 wt %, AOc monomer 25 wt %, and AEF monomer 25 wt %, but with different molecular mass than AB-AOc-AEF-1 terpolymer; the terpolymers are evaluated as antifoaming agents in gasified super-heavy crude oil of 13.08° API, a concentrations of 250 ppm and are compared with the commercial silicon-based product IMP-SI-1.

Figure 7:
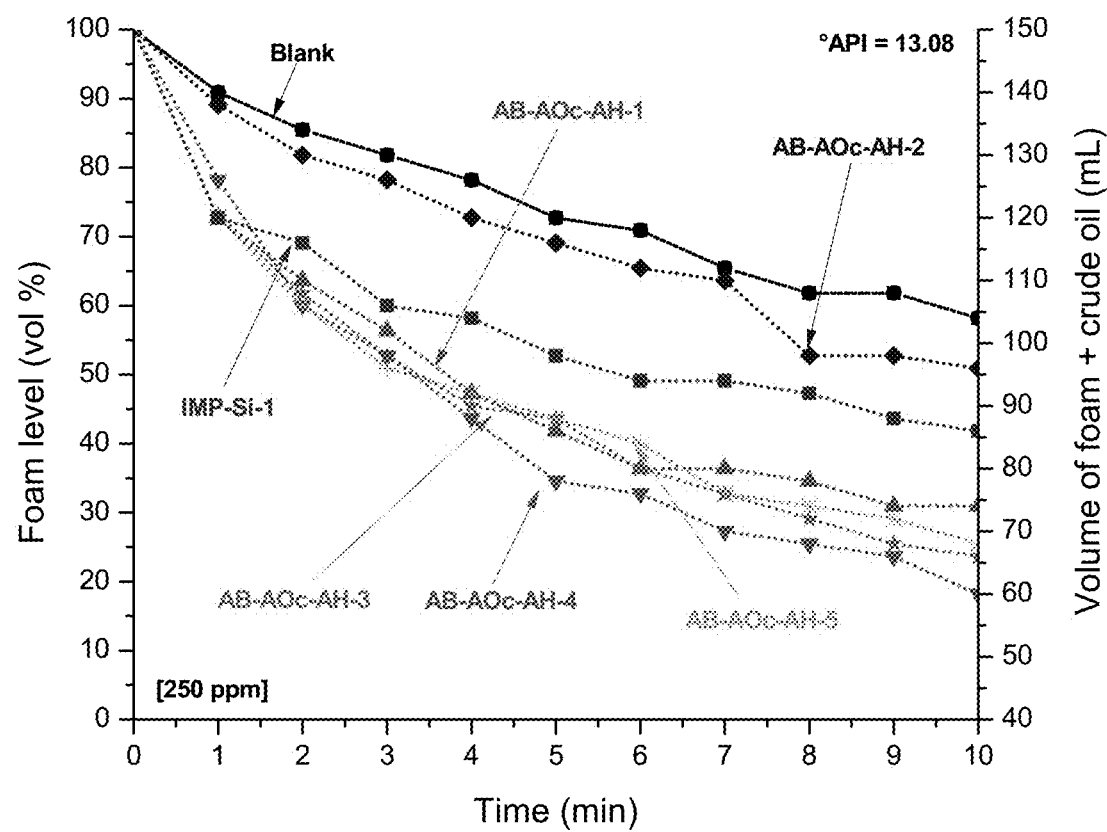

FIG. 7 presents the performance of AB-AOc-AH-1 terpolymer with a chemical composition of AB monomer 33 wt %, AOc monomer 33 wt %, and AH monomer 33 wt %; AB-AOc-AH-2 terpolymer with a chemical composition of AB monomer 50 wt %, AOc monomer 25 wt %, and AH monomer 25 wt %; AB-AOc-AH-3 terpolymer with a chemical composition of AB monomer 25 wt %, AOc monomer 50 wt %, and AH monomer 25 wt %; AB-AOc-AH-4 terpolymer with a chemical composition of AB monomer 25 wt %, AOc monomer 25 wt %, and AH monomer 50 wt %; AB-AOc-AH-5 terpolymer with a chemical composition of AB monomer 50 wt %, AOc monomer 25 wt %, and AH monomer 25 wt %, but with different molecular mass than AB-AOc-AH-1 terpolymer; the terpolymers are evaluated as antifoaming agents in gasified super-heavy crude oil of 13° API a concentration of 250 ppm and are compared with the commercial silicon-based product IMP-SI-1.

Figure 8:
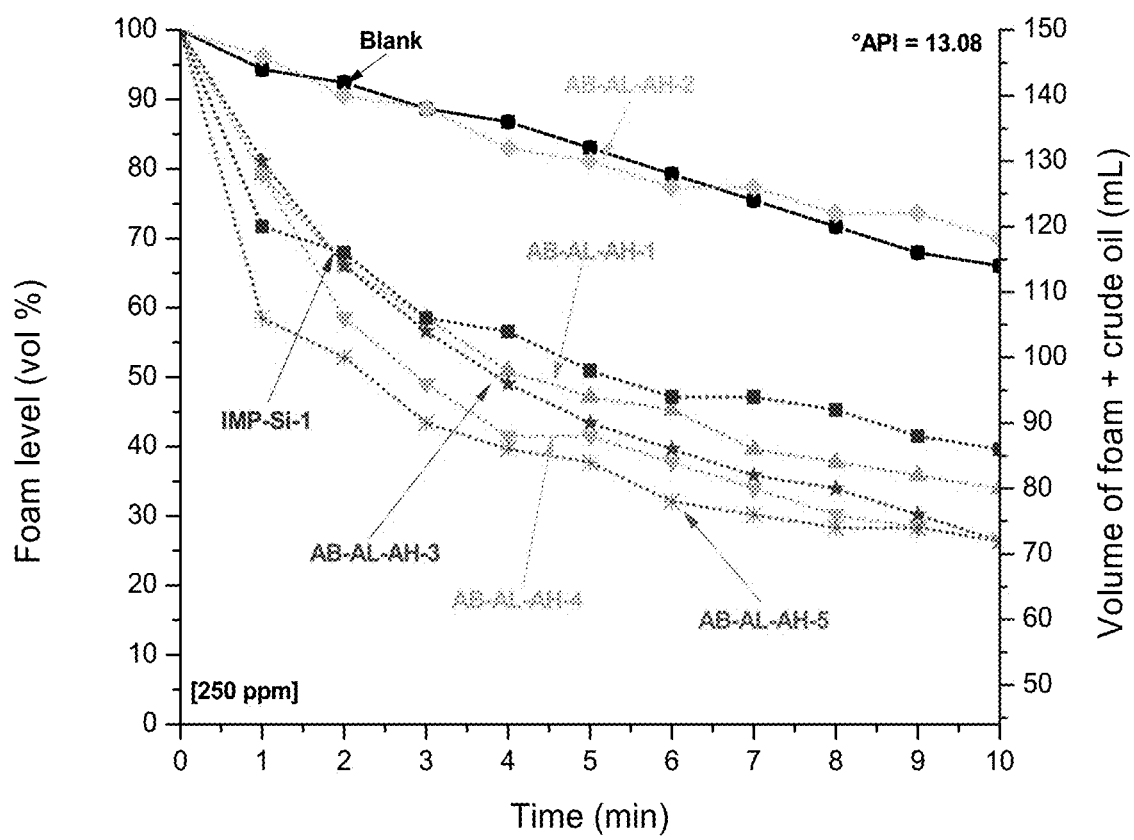

FIG. 8 depicts the performance of AB-AL-AH-1 terpolymer with a chemical composition of AB monomer 33 wt %, AL monomer 33%, and AH monomer 33 wt %; AB-AL-AH-2 terpolymer with a chemical composition of AB monomer 50 wt %, AL monomer 25 wt %, and AH monomer 25 wt %; AB-AL-AH-3 terpolymer with a chemical composition of AB monomer 25 wt %, AL monomer 50 wt %, and AH monomer 25 wt %; AB-AL-AH-4 terpolymer a chemical composition of AB monomer 25 wt %, AL monomer 25 wt %, and AH monomer 50 wt %; AB-AL-AH-5 terpolymer with a chemical composition of AB monomer 50 wt %, AL monomer 25 wt %, and AH monomer 25 wt %, but with different molecular mass than AB-AL-AH-1 terpolymer; the terpolymers are evaluated as antifoaming agents in gasified super-heavy crude oil of 13° API a concentration of 250 ppm and are compared with the commercial silicon-based product IMP-SI-1.

Figure 9:
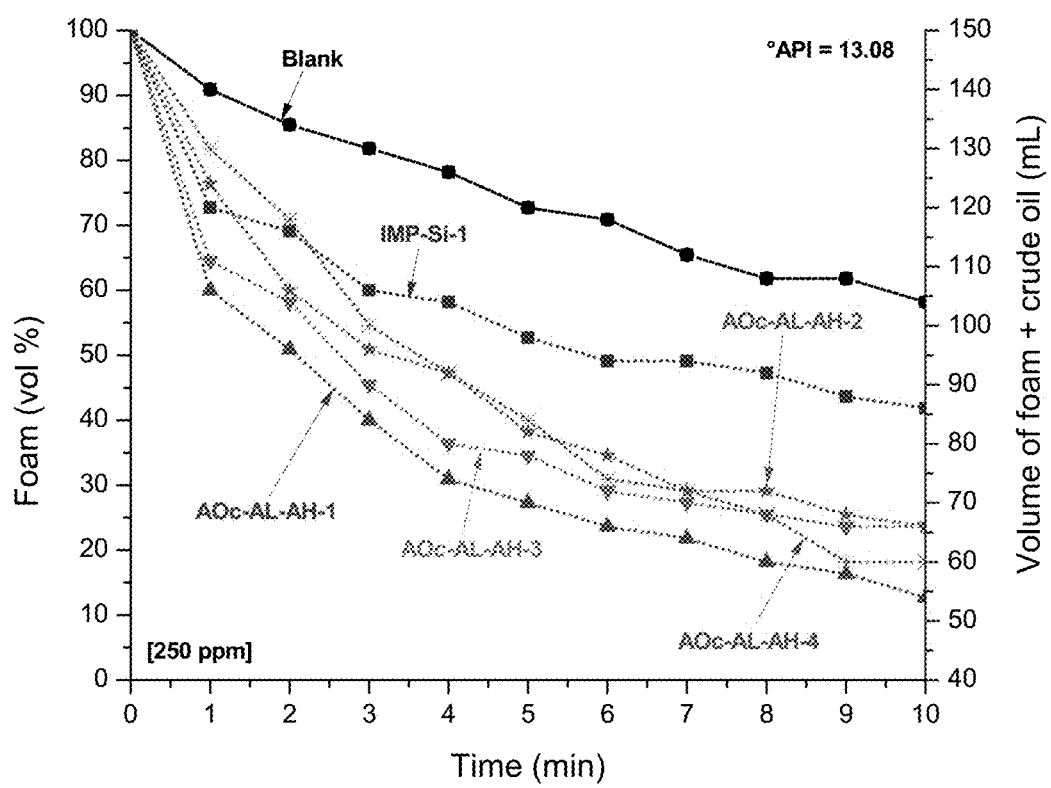

FIG. 9 shows the performance of AOc-AL-AH-1 terpolymer with a chemical composition of AOc monomer 33 wt %, AL monomer 33 wt %, and AH monomer 33 wt %; AOc-AL-AH-2 terpolymer with a chemical composition of AOc monomer 25 wt %, AL monomer 50 wt %, and AH monomer 25 wt %; AOc-AL-AH-3 terpolymer with a chemical composition of AOc monomer 25 wt %, AL monomer 25 wt %, and AH monomer 50 wt %; AOc-AL-AH-4 terpolymer with a chemical composition of AOc monomer 50 wt %, AL monomer 25 wt %, and AH monomer 25 wt %; the terpolymers are evaluated as antifoaming agents in gasified super-heavy crude oil of 13.08° API a concentrations of 250 ppm and are compared with the commercial silicon-based product IMP-SI-1.

Figure 10:
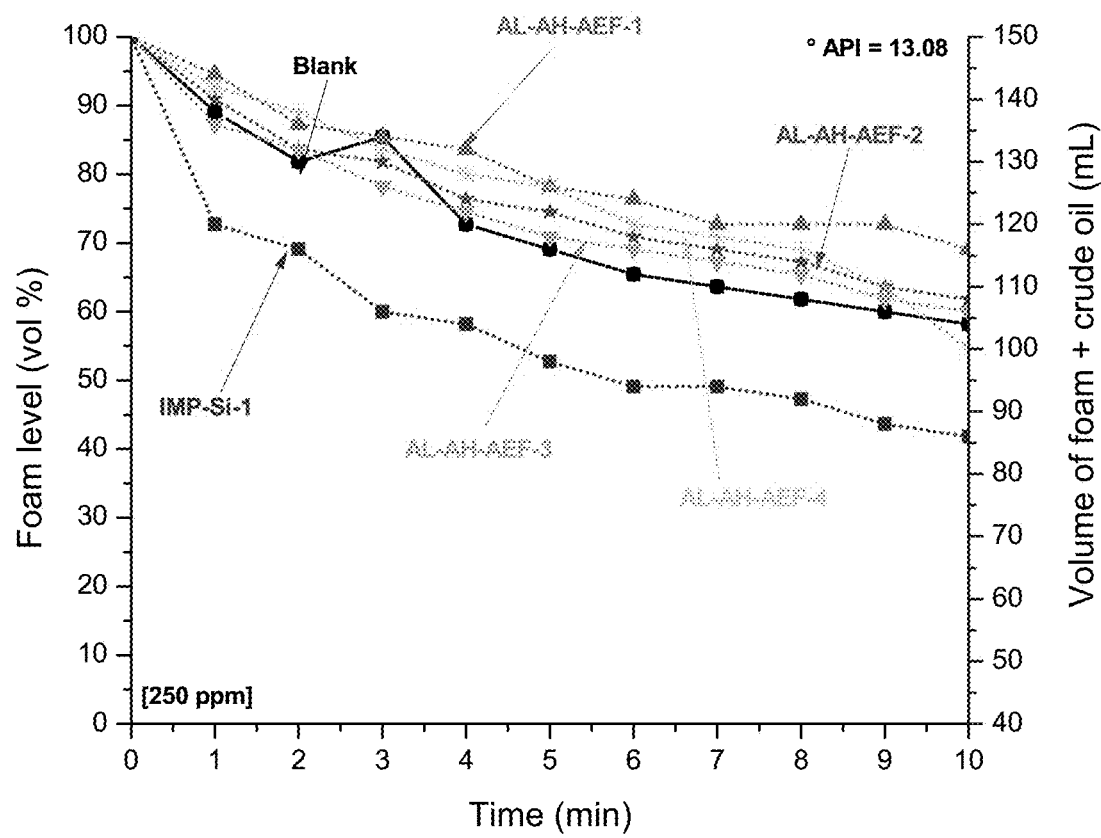

FIG. 10 illustrates the performance of AL-AH-AEF-1 terpolymer with a chemical composition of AL monomer 33 wt %, AH monomer 33 wt %, and AEF monomer 33%; AL-AH-AEF-2 terpolymer with a chemical composition of AL monomer 25 wt %, AH monomer 50 wt %, and AEF monomer 25 wt %; AL-AH-AEF-3 terpolymer with a chemical composition of AL monomer 25 wt %, AH terpolymer 25 wt %, and AEF terpolymer 50 wt %; AL-AH-AEF-4 terpolymer with a chemical composition of AL monomer 50 wt %, AH monomer 25 wt %, and AEF monomer 25 wt %; the terpolymers are evaluated as antifoaming agents in gasified super-heavy crude oil of 13° API a concentration of 250 ppm and are compared with the commercial silicon-based product IMP-SI-1.

Figure 11:
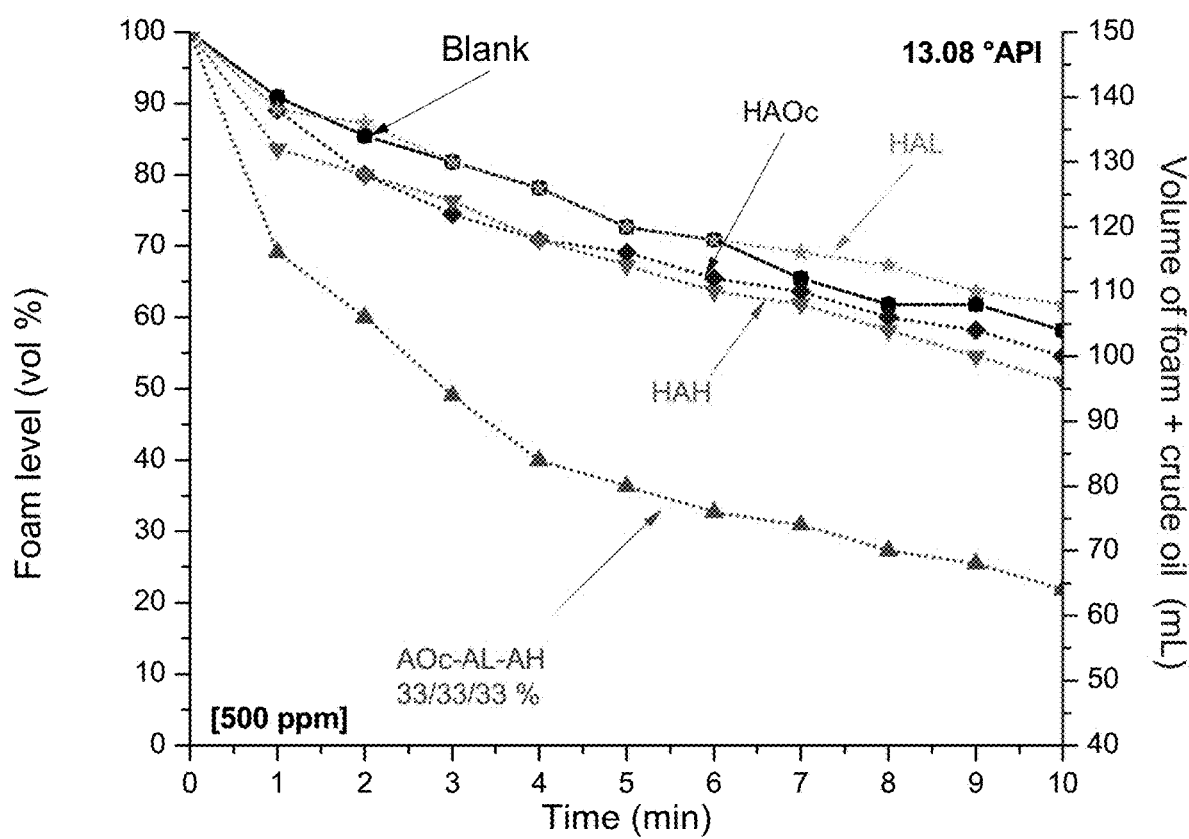
Figure 12:
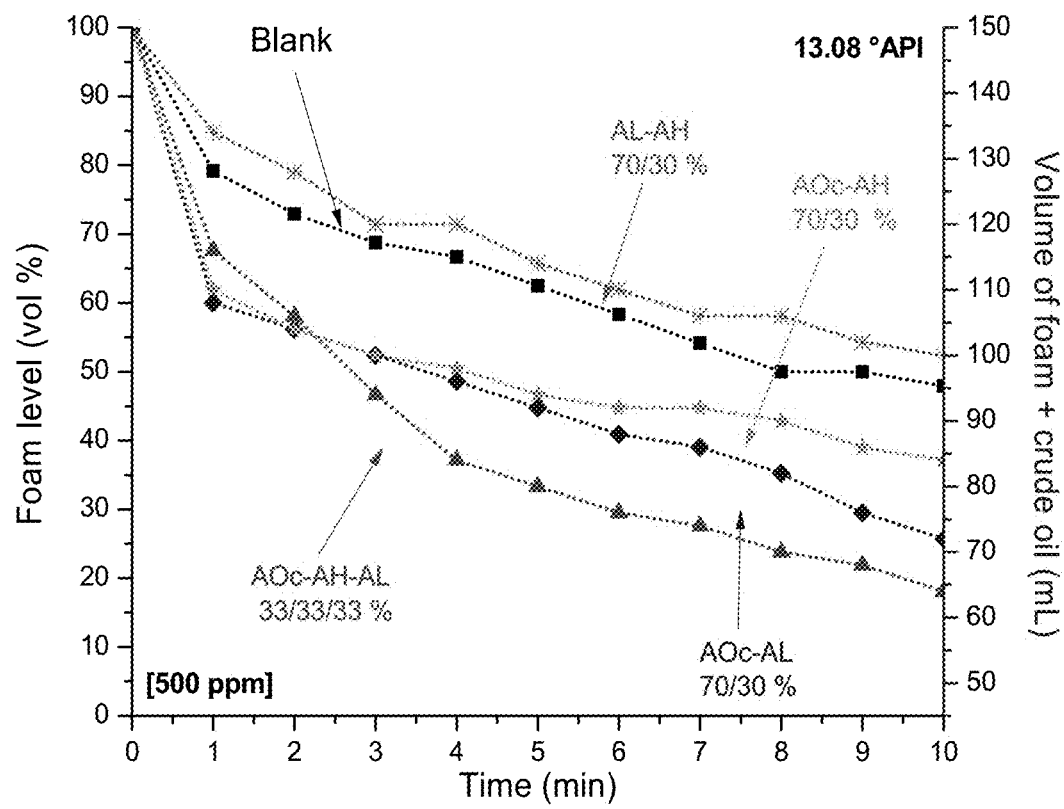

By way of demonstration, it does not imply any limitation, in FIGS. 11 and 12 are shown the results of the evaluations of a terpolymer of TER (AOc-AL-AH) series as antifoaming agent in super-heavy crude oil (° API=13.08), dosed at 500 ppm, in comparison with the started homopolymers (MX/a/2013/014352) and with the copolymer series (MX/E/2015/009234) synthesized with the same monomers in a weight ratio of 70/30 wt %/wt %.

In FIG. 11 is shown the performance as antifoaming agents of HAOc, HAL and HAH homopolymers, which show a similar behavior to the blank, having lacking activity as defoamer; in contrast, terpolymer that incorporates in its composition this three monomers (AOc, AL and AH), in equal proportion of each one of 33 wt %, to exhibit a good antifoaming activity, taking down the foam approximately on 40% faster than the blank. All samples are evaluated at a concentration of 500 ppm.

FIG. 12 shows the performance as antifoaming agent of copolymers series with AOc, AL, and AH monomers, in a ratio of 70/30 wt %/wt % in comparison with terpolymer composed by the same monomers, in a ratio of 33 wt %, respectively. Regarding the AOc-AH and AOc-AL copolymers was observed a similar behavior to both, taking down the foam approximately on 10 and 25%, respectively, in relation with the blank. In the case of Al-AH copolymer, a foam stabilization was observed, favoring it in approximately 10%. However, TER (AOc-AH and AOc-AL) terpolymer has a potential foam suppression of 30%, respect to the blank, working better that copolymers mentioned above. Once again, all same were evaluated a concentration of 500 ppm.

DETAILED DESCRIPTION OF THE INVENTION

In the present invention has carried out the synthesis of terpolymers based on alkyl acrylates (polymers constituted by random sequences of three monomers in the polymeric chain) and has been evaluated as antifoaming agents in gasified heavy crude oil (° API=15) and gasified super-heavy crude oil (° API=13). Random terpolymers based on alkyl acrylate have shown an excellent performance as inhibitors and suppressor of foam in petroleum. These new foam suppressor agents were compared with a commercial silicon-based antifoam (IMP-Si-1) at same concentrations. The attainment of this document is based on the results that previously have been obtained in the patent application entitled: "Formulaciones de homopolimeros base acrilatos de alquilo empleadas como antiespumantes en aceites crudos pesados y súper pesados" (Mexican patent application MX/a/2013/014352) and "Formulaciones de copolímeros base acrilatos de alquilo empleadas como antiespumantes en aceites crudos pesados y súper pesados" (Mexican patent application MX/a/2015/009234).

To prepare the formulation of terpolymers of alkyl acrylates as antifoaming agents, the method described below was employed. This method is illustrative and do not imply any limitation:

Terpolymers based on alkyl acrylates were synthesized as a latex by semi-continuous emulsion polymerization, synthesis method described in U.S. Patent 20110067295A1 (Castro, 2011). Latex is a dispersion of polymeric particles in water, easy to process because it avoids the usage of organic solvents. Final latex is preferably dewatered by distillation at a temperature of 80 to 120° C., and a suitable organic solvent is added to allow its final application as an antifoaming agent in gasified crude oils with densities between 10 and 40° API, preferably employing solvents whose boiling point is in the range of 35 to 200° C., such as: dichloromethane, methanol, ethanol, isopropanol, chloroform, benzene and its derivatives, toluene, xylene, jet fuel, naphtha, individually or mixtures of them. The amount of terpolymer in the solution is in a range preferably from 10 wt % to 50 wt %.

The structure of the different alkyl acrylate terpolymers of the present invention, preferably with alkyl esters of acrylic acid or methacrylic acid, is shown in Formula (1):

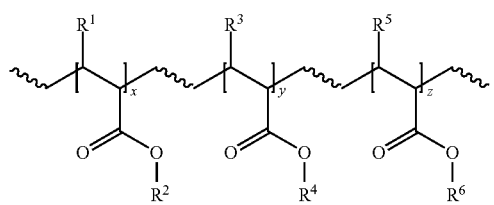

(1)

where:
$R^1$, $R^2$, $R^3$, $R^4$, $R^5$ and $R^6$ are independent radicals represented by the groups listed below:
$R^1$, $R^3$, and $R^5$=H (hydrogen), $CH_3$ (methyl);
$R^2$, $R^4$, and $R^6$=$CH_3$ (methyl), $C_2H_5$ (ethyl), $C_4H_9$ (n-butyl, isobutyl), $C_6H_{13}$ (n-hexyl, iso-hexyl), $C_8H_{17}$ (2-ethylhexyl) $C_8H_{17}$ (n-octyl), $C_{10}H_{21}$ (n-decyl, iso-decyl), $C_{12}H_{25}$ (n-dodecyl), $C_{18}H_{37}$ (n-octadecyl), $C_8H_9O$ (2-phenoxyethyl), $C_3H_7O$ (2-methoxyethyl), $C_5H_{11}O_2$ (2-(2-methoxyethoxy) ethyl). This aliphatic chain can contain heteroatoms from the ether group and benzene type aromatic rings or heteroatomic rings from ether type.
Where else:
x=is a number from 2 to 900.
y=is a number from 2 to 900.
z=is a number from 2 to 900.
"x", "y" and "z" could present in random sequences.
Additionally, the molecular weights are in the following ranges from 1000 to 200 000 Daltons.

The following describes by way of example, it does not imply any limitation, the monomers used in the synthesis of the terpolymers object of this invention: methyl acrylate, ethyl acrylate, butyl acrylate, n-amyl acrylate, isobornyl acrylate, isobutyl acrylate, tert-butyl acrylate, hexyl acrylate, 2-ethylhexyl acrylate, 3,5,5-trimethylhexyl acrylate, 2-methoxiethyl acrylate, 2-phenoxiethyl acrylate, 4-tert-butylcyclohexyl acrylate, octyl acrylate, isodecyl acrylate, decyl acrylate, lauryl acrylate, tridecyl acrylate, octadecyl acrylate or behenyl acrylate.

The method consists of adding an effective amount of the terpolymer based on alkyl acrylate to gasified crude oil with densities from 10 to 40° API, in concentrations between 10 and 2000 ppm, to inhibit the formation of foam.

The present invention is described in respect to specific number of examples, which are considered as illustrative and does not mean limitation. Once obtained, the terpolymers based on alkyl acrylate were characterized using the following instrumental methods:
1.—Size exclusion chromatograph Agilent® model 1100, with PLgel column and using tetrahydrofuran (THF) as eluent, to calculate the copolymers molecular mass distribution and polydispersity index (I).
2.—Fourier Transform Infrared band spectrometer model Thermo Nicolet® AVATAR 330 using the method of film technique with software OMNIC® version 7.0.

Average molecular masses, polydispersity index and spectroscopic characteristics of the terpolymers based on alkyl acrylate are listed in Tables 1-6; and their spectroscopic characteristics from some different alkyl acrylate polymers synthesized, which does not mean any limitation:

In Table 1 is shown the results for alkyl polyacrylate ($R^1$=hydrogen, $R^2$=n-butyl, $R^3$=hydrogen, $R^4$=n-octyl, $R^5$=hydrogen, $R^6$=phenoxyethyl), which does not mean limitation:

TABLE 1

Number average molecular mass (Mn) and polydispersity index (I) of terpolymers measured by SEC.

| Terpolymer | Mn (Daltons) | I |
|---|---|---|
| TER (AB-AOc-AEF-1) | 33 000 | 2.52 |
| TER (AB-AOc-AEF-2) | 29 000 | 2.41 |
| TER (AB-AOc-AEF-3) | 37 000 | 2.71 |
| TER (AB-AOc-AEF-4) | 32 000 | 2.48 |
| TER (AB-AOc-AEF-5) | 22 000 | 2.37 |

In Table 2 is shown the results for alkyl polyacrylate ($R^1$=hydrogen, $R^2$=n-butyl, $R^3$=hydrogen, $R^4$=n-octyl, $R^5$=hydrogen, $R^6$=n-hexyl), which does not mean limitation:

TABLE 2

Number average molecular mass (Mn) and polydispersity index (I) of terpolymers measured by SEC.

| Polymer | Mn (Daltons) | I |
|---|---|---|
| TER (AB-AOc-AH-1) | 94 000 | 4.17 |
| TER (AB-AOc-AH-2) | 75 000 | 3.67 |
| TER (AB-AOc-AH-3) | 83 000 | 3.96 |
| TER (AB-AOc-AH-4) | 125 000 | 5.00 |
| TER (AB-AOc-AH-5) | 62 000 | 4.70 |

In Table 3 are shown the results for alkyl polyacrylate ($R^1$=hydrogen, $R^2$=n-butyl, $R^3$=hydrogen, $R^4$=n-lauryl, $R^5$=hydrogen, $R^6$=n-hexyl), which does not mean limitation:

TABLE 3

Number average molecular mass (Mn) and polydispersity index (I) of terpolymers measured by SEC.

| Polymer | Mn (Daltons) | I |
|---|---|---|
| TER (AB-AL-AH-1) | 167 800 | 5.16 |
| TER (AB-AL-AH-2) | 127 100 | 5.45 |
| TER (AB-AL-AH-3) | 191 300 | 5.47 |

TABLE 3-continued

Number average molecular mass (Mn) and polydispersity index (I) of terpolymers measured by SEC.

| Polymer | Mn (Daltons) | I |
|---|---|---|
| TER (AB-AL-AH-4) | 180 700 | 5.75 |
| TER (AB-AL-AH-5) | 100 200 | 4.43 |

In Table 4 are shown the results for alkyl polyacrylate ($R^1$=hydrogen, $R^2$=n-octyl, $R^3$=hydrogen, $R^4$=n-lauryl, $R^5$=hydrogen, $R^6$=n-hexyl), which does not mean limitation:

TABLE 4

Number average molecular mass (Mn) and polydispersity index (I) of terpolymers measured by SEC.

| Polymer | Mn (Daltons) | I |
|---|---|---|
| TER (AOc-AL-AH-1) | 173300 | 5.55 |
| TER (AOc-AL-AH-2) | 143900 | 5.01 |
| TER (AOc-AL-AH-3) | 195500 | 5.77 |
| TER (AOc-AL-AH-4) | 185900 | 6.05 |

In Table 5 are shown the results for alkyl polyacrylate ($R^1$=hydrogen, $R^2$=n-octyl, $R^3$=hydrogen, $R^4$=n-lauryl, $R^5$=hydrogen, $R^6$=n-hexyl), which does not mean limitation:

TABLE 5

Number average molecular mass (Mn) and polydispersity index (I) of terpolymers measured by SEC.

| Polymer | Mn (Daltons) | I |
|---|---|---|
| TER (AL-AH-AEF-1) | 168000 | 5.26 |
| TER (AL-AH-AEF-2) | 191300 | 5.54 |
| TER (AL-AH-AEF-3) | 135500 | 4.57 |
| TER (AL-AH-AEF-4) | 181600 | 5.82 |

Examples

The following examples are presented to illustrate the spectroscopic characteristic of the based on alkyl acrylate and their application as antifoaming agents in crude oils with densities from 10 to 40° API. These examples should not be regarded as limiting what is claimed TER (AB-AOc-AEF-1)

I.R. ν $cm^{-1}$: 2957, 2930, 2872, 1730, 1497, 1456, 1379, 1243, 1158.

TER (AB-AOc-AEF-2)

I.R. ν $cm^{-1}$: 2960, 2932, 2870, 1732, 1499, 1460, 1380, 1245, 1160.

TER (AB-AOc-AH-1)

I.R. ν $cm^{-1}$: 2957, 2930, 2872, 1731, 1457, 1378, 1244, 1158.

TER (AB-AOc-AH-2)

I.R. ν $cm^{-1}$: 2958, 2933, 2868, 1729, 1460, 1380, 1246, 1156.

TER (AB-AL-AH-1)

I.R. ν $cm^{-1}$: 2957, 2928, 2856, 1735, 1455, 1395, 1378, 1250, 1164.

TER (AB-AL-AH-2))

I.R. ν $cm^{-1}$: 2958, 2932, 2860, 1730, 1445, 1385, 1380, 1255, 1160.

TER (AOc-AL-AH-1)

I.R. ν $cm^{-1}$: 2955, 2924, 2856, 1732, 1458, 1377, 1247, 1159.

TER (AOc-AL-AH-2)

I.R. ν $cm^{-1}$: 2950, 2937, 2862, 1728, 1460, 1373, 1252, 1163.

TER (AL-AH-AEF-1)

I.R. ν $cm^{-1}$: 2952, 2923, 2854, 1731, 1497, 1455, 1243, 1159.

TER (AL-AH-AEF-1)

I.R. ν $cm^{-1}$: 2955, 2926, 2848, 1730, 1490, 1448, 1224, 1161.

Evaluation of Polymers as Anti-Foaming Agents in Heavy Crude Oil and Super-Heavy Crude oils, employed in evaluations of the antifoams, are contained in a metal stainless steel vessel with a capacity of 4 liters; oil samples were extracted from the well to the sampling conditions at 76.5° C. and a pressure of 6 kg/cm².

Terpolymers based on alkyl acrylates were evaluated as foam inhibitors in gasified heavy and super-heavy crude oils, using an apparatus for measuring the foam and an assessment procedure implemented by the applicants (Mexican patent application MX/a/2013/013966). The metallic vessel containing the crude oil was instrumented with a nitrogen gas supply line, heating jackets and a vent line for the crude oil, where the antifoaming agents are fed. The foaming process is induced by preheating the stainless steel vessel at an external temperature in a range from 40 to 150° C., and pressurizing the system with nitrogen gas at a pressure in a range from 80 to 150 psi, remaining at these conditions for two hours before starting the test. Once annealing the metal vessel, the crude oil is released using the starting line or exhaust, the defoamer is fed into the outlet pipe through a septum-type connection (diaphragm made of a material which allows entry of a needle and when being extracted can seal the pipe) by using a syringe to a desired dosage (from 10 to 2000 ppm). The foam is formed due to the sudden pressure drop of the pressurized oil in the metal container with respect to external atmospheric pressure.

150 mL of crude oil are released from the metallic vessel with formed foam, being poured into a graduated glass cylinder in approximately during 20 to 40 s. The foam collapse is measured, recording the volumes registered in the graduated glass cylinder every minute for a period of 10 min. Finally, once the test is finished, the crude oil stand in the graduated cylinder until there is no more foam and the residual crude oil is measured.

Gasified heavy and super-heavy crude oils were characterized as follows:

TABLE NO. 6

Physical and physico-chemical features
and properties of evaluated crude oils

| Features | Heavy crude oil | Super-heavy crude oil |
|---|---|---|
| °API | 15.00 | 13.08 |
| Salt content (lb/1000 bbl) | 49.54 | 4.86 |
| Paraffin content (wt %) | 4.32 | 4.25 |
| Pour point (° C.) | −12 | −3 |
| Kinematic viscosity (mm$^2$/s) @ 25° C. | 2309.52 | 16444.80 |
| Cryoscopy MW (g/mol) | 398.00 | 486.20 |
| n-Heptane insolubles (wt %) | 10.45 | 18.42 |
| SARA analysis | | |
| Saturates (wt %) | 6.06 | 12.12 |
| Aromatics (wt %) | 5.95 | 25.19 |
| Resins (wt %) | 71.71 | 42.12 |
| Asphaltenes (wt %) | 16.22 | 20.53 |

Different concentrations of each copolymer were prepared, from 5 to 40 wt %, using solvents with a boiling point in the range from 35 to 200° C., wherein the solvent is dichloromethane, methanol, ethanol, isopropanol, chloroform, benzene, toluene, xylene, jet fuel, naphtha, individually or in mixtures thereof, so small volumes of solution were added in order to stablish that there is no effect of solvent on the foam breaking. The polymers based on alkyl acrylates were evaluated at concentrations in the interval from 10 to 2000 ppm. Terpolymers based on alkyl acrylate were evaluated simultaneously—in order to stablish a comparison—with a commercial silicon-based defoamer (IMP-Si).

By way of demonstration, which does not imply any limitation, FIGS. 1, 2, 3, 4 and 5 show the results of evaluations of TER (AB-AOc-AEF), TER (AB-AOc-AH), TER (AB-AL-AH), TER (AOc-AL-AH), and TER (AL-AH-AEF) terpolymers as antifoaming agents in gasified heavy crude oil (° API=15), dosed at 250 ppm; however, these terpolymers have been dosed from 10 to 2000 ppm. The commercial silicon-based product IMP-SI-1, dosed at 250 ppm, brings down the foam level 20 vol. % faster than that of the blank.

In addition, FIGS. 6, 7, 8, 9 and 10 show the results of the evaluation of TER (AB-AOc-AEF), TER (AB-AOc-AH), TER (AB-AL-AH), TER (AOc-AL-AH), and TER (AL-AH-AEF) terpolymers as antifoaming agents in gasified super-heavy crude oil (° API=13) dosed at 250 ppm; however, these copolymers have been dosed from 10 to 2000 ppm. The commercial silicon-based product IMP-SI-1, dosed at 250 ppm, brings down the foam level 20 vol % faster than that of the blank. The efficiency of the terpolymers based on alkyl acrylates is compared with the blank.

As a demonstration, which does not imply any limitation, FIGS. 11 and 12 show the results of the evaluation of TER (AOc-AL-AH) terpolymer series as antifoaming agents in gasified heavy crude oil (° API=13.08), dosed at 500 ppm, comparing with the started homopolymers (MX/a/2013/014352) and with the copolymer series (MX/E/2015/009234) synthesized with the same monomers in a ratio of 70/30 wt %/wt %.

In FIG. 1 is observed that AB-AOc-AEF terpolymer series show the following behavior as antifoaming agents: AB-AOc-AEF-1, AB-AOc-AEF-3, AB-AOc-AEF-4, and AB-AOc-AEF-5, which are not as efficient to inhibit the foam, regardless of the ratio of AB, AOc and AEF monomers, bringing down approximately until 5% faster than the blank; AB-AOc-AEF-2 terpolymer tends to stabilize the foam; commercial silicon-based product IMP-SI-1 base abates the foam 20%, both dosed at 250 ppm.

In FIG. 2 is observed that AB-AOc-AH-4 terpolymer is more efficient as foam inhibitor compared with the commercial silicon-based product IMP-Si, abating the foam approximately 45 vol % and 25 vol % faster than the blank, respectively, both dosed at 250 ppm. In comparison to AB-AOc-AH-1, AB-AOc-AH-3, and AB-AOc-AH-5 terpolymers, the efficiency to inhibit the foam is approximately 40% in relation to the blank, also dosed at 250 ppm. AB-AOc-AH-2 terpolymer show a slight efficiency as foam inhibitor, being of 15 vol % regarding the blank. Therefore, AH in a high ratio in the AB-AOc-AH-4 (25/25/50 wt %) terpolymer has boosted the efficiency of the antifoaming agent.

In FIG. 3 is viewed that AB-AL-AH-2 terpolymer behaves as the blank. On the other hand, AB-AL-AH-3 (25/50/25 wt %) and AB-AL-AH-4 (25/25/50 wt %) terpolymers are the most efficient as foam inhibitor in 50% in relation to the blank, noting that an increase of 50 wt % of AL or AH monomers boost the antifoam effect. Furthermore, AB-AL-AH-1 and AB-AL-AH-5 (33/33/33 wt %) terpolymers are slightly more efficient than the commercial silicon-based product IMP-SI, inhibiting the foam in 45% and 30% regarding the blank, respectively.

In FIG. 4 is observe than both terpolymer, AOc-AL-AH-1 and AOc-AL-AH-4, show the best performance as defoamer, abating the foam of the heavy crude oil in 50%, regarding the blank; AOc-AL-AH-2, and AOc-AL-AH-3 terpolymer are slightly less efficient, both decrease the foam in 45% faster than the blank. In all cases there is no dependence on the composition by weight of the used monomers. All terpolymers have a higher performance as foam inhibitors higher than the silicon-based, being their efficiency from 20 to 25% in relation to the blank, dosed all at 250 ppm.

In FIG. 5 is observed that AL-AH-AEF terpolymer series have a similar behavior to the blank, and promoting the foam stabilization, regardless the ratio of AL, AH or AEF, and all terpolymers are less efficient that the silicon-based polymer, which decreases the foam from 10% to 15% relative to the blank. All compounds were dosed at 250 ppm.

In FIG. 6 is shown the AB-AOc-AEF terpolymer series, which have a comparable efficiency as foam inhibitor with the blank, regardless the monomer ratio; silicon-base polymer IMP-SI-1 abates the foam between 15 and 20%, dosed at 250 ppm.

In FIG. 7 is observed that AB-AOc-AH terpolymer series, where again, they are efficient as foam inhibitor; for the AB-AOc-AH-2 terpolymer, that have a low molecular mass, behaves similar to the blank. On the other hand, the other terpolymers, regardless the monomer weight percentage ratio, abate the foam between 25 and 30% faster than the blank, being the AB-AOc-AH-4 terpolymer, with a monomer ratio of 25, 25, and 50 wt %, respectively, which abates the higher amount of foam regarding the blank, with a 40% of foam suppression, even better than the commercial silicon-based product IMP-SI-1, which reduces between 15 and 20% of foam; all products were dosed at 250 ppm.

In FIG. 8 is observed that AB-AL-AH-2 terpolymer behaves as the blank. On the other hand, AB-AL-AH-3 (25/50/25 wt %), AB-AL-AH-4 (25/25/50 wt %) and AB-AL-AH-5 (33/33/33 wt %) terpolymers are the most efficient as foam inhibitor in 40% relative to the blank, noting that the monomer ratio is not preponderant in the antifoaming effect. About AB-AL-AH-1 (33/33/33 wt %) terpolymer, it is slightly less efficient that its homologous, slackening the foam in 30%; with respect to the commercial silicon-based product IMP-SI, which inhibits the foam between 25 and 30% in relation to the blank.

In FIG. 9 is observed that AOc-AL-AH-1 and AOc-AL-AH-4 terpolymers show the best antifoaming performance, decreasing the foam in heavy crude oil in 45%, relative to the blank; AOc-AL-AH-2 and AOc-AL-AH-3 terpolymers are slightly less efficient, which abate the foam in 35% faster than the blank. In all cases there is no dependence on the composition by weight of the used monomers. All terpolymers have a higher performance as foam inhibitors higher than the silicon-based, being its efficiency between 15 and 20% in relation to the blank, all products were dosed at 250 ppm.

In FIG. 10 is observed that AL-AH-AEF terpolymer series have a similar behavior as the blank, and tend to stabilize the foam, regardless the ratio of AL, AH or AEF monomers, and all terpolymers are less efficient that the silicon-based polymer, which abates the foam in 20% regarding the blank. All products were dosed at 250 ppm.

In FIG. 11 is observed the performance as antifoaming agents of HAOc, HAL and HAH homopolymers, which show a behavior similar to the blank, having a null antifoaming activity; contrary, the terpolymer, that includes in its composition the three monomers (AOc, AL, and AH), in a ration each one of 33 wt %, exhibit a good antifoaming activity, abating the foam approximately in 40% faster than the blank. All evaluated products were dosed at 500 ppm.

In FIG. 12 is presented the performance as antifoaming agent the copolymer series with the AOc, AL, and AH monomers, in a weight ratio of 70/30 wt %/wt % in comparison with the terpolymer composed by the same monomers, in a weight ratio of 33% m, respectively. Regarding the AOc-AH and AOc-AL copolymers was detected a similar behavior to both, reducing approximately 10 and 25% of foam relative to the blank. In the case of the Al-AH copolymer, the simple tends to stabilize the foam, assisted in approximately 10%. However, TER (AOc-AH and AOc-AL) terpolymer show a foam suppression potential of 30% regarding to the blank, being better that the copolymers mentioned earlier. Again, all samples were evaluated at a concentration of 500 ppm).

The invention claimed is:

1. Terpolymers based on alkyl acrylates of structural formula (1) with an application as antifoaming agents of gasified crude oils to reduce foam formation;

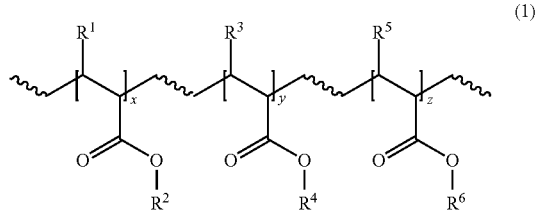

(1)

wherein:
$R^1$, $R^2$, $R^3$, $R^4$, $R^5$, and $R^6$ are independent radicals represented by the chemical groups listed below:
$R^1$, $R^3$ and $R^5$=H (hydrogen), $CH_3$ (methyl);
$R^2$, $R^4$ and $R^6$=$CH_3$ (methyl), $C_2H_5$ (ethyl), $C_4H_9$ (n-butyl, isobutyl), $C_6H_{13}$ (n-hexyl, iso-hexyl), $C_8H_{17}$ (2-ethyl-hexyl), $C_8H_{17}$ (n-octyl), $C_{10}H_{21}$ (n-decyl iso-decyl), $C_{12}H_{25}$ (n-dodecyl), $C_{18}H_{37}$ (n-octadecyl), $C_8H_9O$ (2-phenoxyethyl), $C_3H_7O$ (2-methoxyethyl), $C_5H_{11}O_2$ (2-(2-methoxyethoxy) ethyl); wherein the chemical groups contain heteroatoms from the ether group and benzene type aromatic rings or heteroatomic rings of ether moiety;

wherein:
x=is a number from 2 to 900;
y=is a number from 2 to 900;
z=is a number from 2 to 900; and
x, y and z are present in random sequences; and
wherein the terpolymers are synthesized by semi-continuous emulsion polymerization at a controlled temperature;
wherein the terpolymers consist of macromolecular linear polymeric chains formed from alkyl acrylate monomers consisting of a first acrylic monomer, a second acrylic monomer, and a third acrylic monomer, and wherein the terpolymers are not part of a grafted copolymer or an interjacent complex formed from a copolymer; and
wherein the terpolymers have a number-average molecular mass of a magnitude between 1000 and 42,000 Daltons, inclusive, and a polydispersity index of a magnitude greater than 2.35 and less than about 7.00.

2. The terpolymers according to claim 1, wherein the gasified crude oils have densities between 10 and 40° API.

3. The terpolymers according to claim 1, wherein the terpolymer is obtained from the following acrylic monomers: methyl acrylate, ethyl acrylate, butyl acrylate, isobornyl acrylate, isobutyl acrylate, tert-butyl acrylate, hexyl acrylate, 2-ethylhexyl acrylate, 2-methoxiethyl acrylate, 2-phenoxiethyl acrylate, 4-tert-butylcyclohexyl acrylate, octyl acrylate, isodecyl acrylate, decyl acrylate, lauryl acrylate, or octadecyl acrylate.

4. The terpolymers according to claim 3, where the terpolymers have a number-average molecular mass from 7000 to 42,000 Daltons.

5. The terpolymers according to claim 4, wherein an aqueous phase present during its synthesis is eliminated by distillation at a temperature between 80 and 120° C., and wherein the eliminated aqueous phase is replaced by an organic solvent during the distillation.

6. The terpolymers according to claim 5, wherein the organic solvent employed to dissolve the terpolymers present boiling points between 35 and 200° C.

7. The terpolymers according to claim 6, wherein the organic solvent employed to dissolve the said terpolymers is dichloromethane, methanol, ethanol, isopropanol, chloroform, benzene, toluene, xylene, turbosine or naphtha, individually or mixed.

8. The terpolymers according to claim 6, wherein the alkyl acrylate terpolymers formulated with solvents has a terpolymer concentration between 10 and 50 wt % relative to the total amount of terpolymer and solvent.

9. A formulation comprising two or more terpolymers based on alkyl acrylates of structural formula (1) with an application as antifoaming agents of gasified crude oils to reduce foam formation;

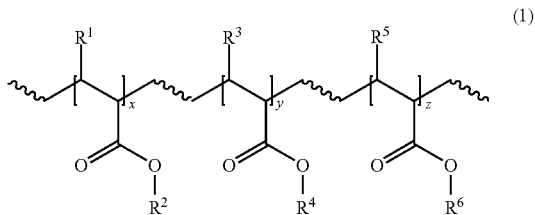

(1)

wherein:

$R^1$, $R^2$, $R^3$, $R^4$, $R^5$, and $R^6$ are independent radicals represented by the chemical groups listed below:

$R^1$, $R^3$ and $R^5$=H (hydrogen), $CH_3$ (methyl);

$R^2$, $R^4$ and $R^6$=$CH_3$ (methyl), $C_2H_5$ (ethyl), $C_4H_9$ (n-butyl, isobutyl), $C_6H_{13}$ (n-hexyl, iso-hexyl), $C_8H_{17}$ (2-ethyl-hexyl), $C_8H_{17}$ (n-octyl), $C_{10}H_{21}$ (n-decyl iso-decyl), $C_{12}H_{25}$ (n-dodecyl), $C_{18}H_{37}$ (n-octadecyl), $C_8H_9O$ (2-phenoxyethyl), $C_3H_7O$ (2-methoxyethyl), $C_5H_{11}O_2$ (2-(2-methoxyethoxy) ethyl); wherein the chemical groups contain heteroatoms from the ether group and benzene type aromatic rings or heteroatomic rings of ether moiety;

wherein:

x=is a number from 2 to 900;

y=is a number from 2 to 900;

z=is a number from 2 to 900; and x, y and z are present in random sequences; and wherein each of the said terpolymers is synthesized by semi-continuous emulsion polymerization at a controlled temperature;

wherein each of the said terpolymers consists of macromolecular linear polymeric chains formed from alkyl acrylate monomers consisting of a first acrylic monomer, a second acrylic monomer, and a third acrylic monomer, and wherein each of the said terpolymers is not part of a grafted copolymer or an interjacent complex formed from a copolymer;

wherein each of the said terpolymers has a number-average molecular mass of a magnitude between 1000 and 42,000 Daltons, inclusive, and a polydispersity index of a magnitude greater than 2.35 and less than about 7.00; and wherein the two or more terpolymers based on alkyl acrylates may be mixed to create the formulation.

10. The terpolymers according to claim 1, wherein the terpolymers are dosed in the gasified crude oils at a concentration between 10 and 2000 ppm.

11. The terpolymers according to claim 7, wherein the alkyl acrylate terpolymers formulated with solvents has a terpolymer concentration between 10 and 50 wt % relative to the total amount of terpolymer and solvent.

12. The formulation comprising two or more terpolymers according to claim 9, wherein the formulations are dosed in the gasified crude oils at a concentration between 10 and 2000 ppm.

13. The terpolymers according to claim 1, wherein x is a number from 20 to 850, y is a number from 20 to 850, and z is a number from 20 to 850.

14. The terpolymers according to claim 1, where x is a number from 60 to 600, y is a number from 60 to 600, and z is a number from 60 to 600.

15. The terpolymers according to claim 2, wherein the gasified crude oils have densities between 12 and 22° API.

16. The terpolymers according to claim 4, wherein an aqueous phase present during their synthesis is eliminated by distillation at a temperature between 90 and 110° C.

17. The terpolymers according to claim 1, wherein the terpolymer formulations are dosed in the gasified crude oils at a concentration between 100 and 1500 ppm.

* * * * *